US011119178B2

(12) United States Patent
Tidhar

(10) Patent No.: US 11,119,178 B2
(45) Date of Patent: Sep. 14, 2021

(54) ESTIMATING A SOURCE LOCATION OF A PROJECTILE

(71) Applicant: ELTA SYSTEMS LTD., Ashdod (IL)

(72) Inventor: Gil Tidhar, Modiin (IL)

(73) Assignee: ELTA SYSTEMS LTD., Ashdod (IL)

( * ) Notice: Subject to any disclaimer, the term of this patent is extended or adjusted under 35 U.S.C. 154(b) by 233 days.

(21) Appl. No.: 15/988,302

(22) Filed: May 24, 2018

(65) Prior Publication Data
US 2018/0267130 A1 Sep. 20, 2018

Related U.S. Application Data

(63) Continuation of application No. 14/396,916, filed as application No. PCT/IL2013/050360 on Apr. 25, 2013, now Pat. No. 10,006,981.

(30) Foreign Application Priority Data

Apr. 25, 2012 (IL) .......................... 219409
Oct. 25, 2012 (IL) .......................... 222678

(51) Int. Cl.
| | |
|---|---|
| *G01S 3/04* | (2006.01) |
| *G01S 3/78* | (2006.01) |
| *G01S 3/782* | (2006.01) |
| *G01S 13/58* | (2006.01) |
| *G01S 13/86* | (2006.01) |
| *G01S 3/781* | (2006.01) |
| *G01S 7/40* | (2006.01) |
| *G01S 7/497* | (2006.01) |

(52) U.S. Cl.
CPC .............. *G01S 3/04* (2013.01); *G01S 3/781* (2013.01); *G01S 3/782* (2013.01); *G01S 13/582* (2013.01); *G01S 13/86* (2013.01); *G01S 7/4026* (2013.01); *G01S 7/4972* (2013.01)

(58) Field of Classification Search
CPC ............. G01S 3/04; G01S 3/781; G01S 3/782
USPC ........................................................ 342/54
See application file for complete search history.

(56) References Cited

U.S. PATENT DOCUMENTS 4,780,719 A 10/1988 Frei et al.
5,384,573 A * 1/1995 Turpin ..................... G03H 1/00
342/179

(Continued)

OTHER PUBLICATIONS

Langer D., et al,"Fusing radar and vision for detecting, classifying and avoiding roadway obstacles," Proc. of Conf. on Intelligent Vehicles (2000).

(Continued)

*Primary Examiner* — Erin F Heard
*Assistant Examiner* — Helena H Seraydaryan
(74) *Attorney, Agent, or Firm* — Browdy and Neimark, PLLC

(57) ABSTRACT

According to examples of the presently disclosed subject matter, there is provided a system for estimating a source location of a projectile, comprising an optics an optics subsystem, a radar subsystem and a processor. The processor is adapted to use range and velocity measurements obtained from data provided by the radar subsystem, a source direction and an event start time obtained from data provided by the optical subsystem and a predefined kinematic model for the projectile for estimating a range to a source location of the projectile.

14 Claims, 6 Drawing Sheets

| Parameter | RADAR | Optics | |
|---|---|---|---|
| Aperture ($a$) required for 1mrad angular resolution | X-band 8–12GHz ($\lambda$ ~2.50–3.75cm) ~37m<br>$K_u$-band 12-18GHz ($\lambda$ ~1.67–2.50cm)~25m<br>$K_a$-band 24-40GHz ($\lambda$ ~0.75–1.11cm)~11m | LWIR ($\lambda$ ~8-14µm)<br>MWIR ($\lambda$ ~3-5µm)<br>SWIR ($\lambda$ ~1-2.5µm) | ~0.030m<br>~0.010m<br>~0.005m |
| Receiver signal | $P_\gamma = \dfrac{\sigma \cdot P_t \cdot F^4}{(4\pi)^2} \dfrac{A_\gamma \cdot G_\gamma}{R^4}$ | $P_\gamma = J_{obs} \dfrac{A_\gamma \cdot G_\gamma}{R^2 / \tau_{opt}(R)}$ | |
| Range measurement | Very accurate — pulse Time of Flight measurement | Difficult. Only by means of triangulation from multiple viewpoints, or - passive ranging with signal processing from multiple optical band. | |
| Velocity measurement | Very accurate — Doppler effect measurement | Difficult. Only by means of triangulation from multiple viewpoints. | |
| Weather dependency | Weak | Strong. Inoperable in dense fog and clouds. | |

(56) References Cited

U.S. PATENT DOCUMENTS

| | | | |
|---|---|---|---|
| 5,479,255 A * | 12/1995 | Denny | G01J 3/28 |
| | | | 244/3.16 |
| 5,781,505 A | 7/1998 | Rowland | |
| 5,970,024 A | 10/1999 | Smith | |
| 6,057,915 A | 5/2000 | Squire et al. | |
| 6,496,593 B1 | 12/2002 | Krone, Jr. et al. | |
| 6,621,764 B1 | 9/2003 | Smith | |
| 7,511,252 B1 | 3/2009 | Pedersen et al. | |
| 2008/0191926 A1 | 8/2008 | Benayahu et al. | |
| 2008/0225925 A1* | 9/2008 | Laverdiere | G01J 5/0037 |
| | | | 374/130 |
| 2008/0298207 A1* | 12/2008 | Teraoka | G11B 7/0065 |
| | | | 369/103 |
| 2009/0260511 A1 | 10/2009 | Melnychuk | |
| 2010/0076710 A1* | 3/2010 | Hukkeri | G01S 7/52004 |
| | | | 702/97 |
| 2010/0128455 A1* | 5/2010 | Ophoven | H04N 5/2252 |
| | | | 361/818 |
| 2011/0127328 A1 | 6/2011 | Warren | |
| 2011/0163904 A1* | 7/2011 | Alland | B60R 1/00 |
| | | | 342/1 |
| 2011/0178756 A1 | 7/2011 | Anderson | |
| 2011/0246069 A1 | 10/2011 | Peres et al. | |
| 2011/0267218 A1 | 11/2011 | Graham | |
| 2012/0038539 A1 | 2/2012 | Chang | |

OTHER PUBLICATIONS

Blackman S. et al ,"Improved tracking capability and efficient radar allocation through the fusion of radar and infrared search-and-track observations," Optical Engineering 39(5), 1391-1398 (2000).

Kester L. et al "The FRESNEL Program: Fusion of Radar and Electro-optical Signals for Surveillance on Land," Proc. SPIE 4380, 453-461 (2001).

Kester L. et al "Fusion of Radar and EO-sensors for Surveillance," Proc. SPIE 4380, 462-471 (2001).

Gern A. et al "Robust vehicle tracking fusing radar and vision," in Proc. Int. Conf. Multisensor Fusion Integr. Intell. Syst., 323-328 (2001).

Birkemark C. M et al "Results of the DRIVE I experiment for fusion of IR and Radar Data," Proc. SPIE 4380, 472-479 (2001).

Steux B. et al"Fade: A vehicle detection and tracking system featuring monocular color vision and radar data fusion," in Proc. IEEE Intell. Vehicles Symp., 632-639 (2002).

Fang Y. et al "Depth-based target segmentation for intelligent vehicles: Fusion of radar and binocular stereo," IEEE Trans. Intell. Transp. Syst. 3(3), 196-202 (2002).

Scholz T. K., et al,"Environmental characterization of the marine boundary layer for electromagnetic wave propagation", Proc. SPIE 4884, 71-78 (2003).

Whitehead P.G., et al ,"Range and brightness fusion: using radar and electro-optical data association for tracking small objects," Proc. SPIE 5096, 423-431(2003).

Kawasaki N. et al "Standard platform for sensor fusion on advanced driver assistance system using Bayesian network," Proc. IEEE Intell. Vehicles Symp. 240-255 (2004).

Yonemoto N. et al"A new color, IR, and radar data fusion for obstacle detection and collision warning," Proc. SPIE 5424, 73-80 (2004).

Schultz J et al "Sensor data fusion of optical and active radar data," Proc. SPIE 5429, 490-500 (2004).

Mobus et al "Multi-Target Multi-Object Tracking, Sensor Fusion of Radar and Infrared," IEEE Intelligent Vehicles Symposium (2004).

Amditis A et al "Fusion of infrared vision and radar for estimating the lateral dynamics of obstacles," Information Fusion 6(2), 129-141 (2005).

Everett M et al ,"A Naval Infrared Search and Track Demonstrator and its fusion with other ship sensors," Proc. SPIE 6206, 620626 (2006).

Gang W. et al ,"Discussion on Operating Range of Shipborne Infrared Search-and-Track System," Proc. SPIE 6150, 61501V (2006).

Bombini, L et al "Radar-vision fusion for vehicle detection", A Quarterly Journal in Modern Foreign Literatures ( ( 2006.

Latger J et al,"Simulation of active and passive infrared images using the SE-Workbench," Proc. SPIE 6543, 654302 (2007).

Forand J. L"Method to estimate infrared and radio-frequency synergy," Optical Engineering 46(12), 126001 (2007).

Tan et al "A radar guided vision system for vehicle validation and vehicle motion characterization," in Proc. IEEE Intell. Vehicles Symp., 1059-1066 (2007).

Feng H et al, "Radar and Infrared Data Fusion Algorithm Based on Fuzzy-neural Network," Proc. SPIE 6723, 67233S (2007).

De Villers Y,"A fusion study of a range-Doppler imager with an infrared sensor for ground-to-ground surveillance," Proc. SPIE 7308, 73081B (2009).

Wu et al "Collision Sensing by Stereo Vision and Radar Sensor Fusion," IEEE Trans. on Intelligent Transportation Systems 10(4), 606-614 (2009).

http://en.wikipedia.org/w/index.php?title=Kinetic_energy_penetrator &oldid=629953618, May 2015.

Rahman et al "An Efficient Camera Calibration Technique Offering Robustness and Accuracy Over a Wide Range of Lens Distortion," IEEE Transactions on Image Processing, 21(2), 626-637 (2012).

Grosse et al "Camera calibration using time-coded planar patterns," Opt. Eng. 51, 083604 (2012).

Keane et al "Practical image registration concerns overcome by the weighted and filtered mutual information metric," J. Electron. Imaging 21, 023029 (2012).

Tang et al "Camera calibration method based on parallelogram similarity invariants," Opt. Eng. 51, 053601 (2012).

Rai et al "A C-arm calibration method with application to fluoroscopic image-guided procedures," Proc. SPIE 8316, 831625 (2012).

Kosec et al "Automated model-based calibration of imaging spectrographs," Proc. SPIE 8215, 82150A (2012).

Fetic A. et al "The procedure of a camera calibration using Camera Calibration Toolbox for MATLAB," IEEE MIPRO Conf., 1752-1757 (2012).

Rosecrock et al "Generic camera calibration and modeling using spline surfaces," IEEE Intelligent Vehicles Symposium (IV), 51-56 (2012).

Melo R. et al"A New Solution for Camera Calibration and Real-Time Image Distortion Correction in Medical Endoscopy—Initial Technical Evaluation," IEEE Transactions on Biomedical Engineering, 59(3), 634-644 (2012).

Carr, P.; et al, "Point-less calibration: Camera parameters from gradient-based alignment to edge images," IEEE Workshop on Applications of Computer Vision (WACV),.377-384, (2012).

Xiang et al "A Grid Recognition-Based Calibration Algorithm for Measuring System," IEEE International Conference on Intelligent Computation Technology and Automation (ICICTA), 443-446, (2012).

Vidas et al ,"A Mask-Based Approach for the Geometric Calibration of Thermal-Infrared Cameras," IEEE Transactions on Instrumentation and Measurement 61(6),1625-1635 (2012).

Herrera C. et al "Joint Depth and Color Camera Calibration with Distortion Correction," IEEE Transactions on Pattern Analysis and Machine Intelligence 34(10), 2058-2064 (2012).

Cai et al "Revisiting Principal-Axes Aligned conies: A unified algebraic constraint and geometric interpretation for camera calibration," IEEE International Conference on Information and Automation (ICIA), 691-697 (2012).

Yin et al "A new method of calibrating the camera nonlinear model," IEEE International Conference on Modeling, Identification & Control (ICMIC),80-85 (2012).

Grundmann, M et al "Calibration-free rolling shutter removal," IEEE International Conference on Computational Photography (ICCP), 1-8 (2012).

Calore, E. et al I.; "Accelerometer based horizon and keystone perspective correction," IEEE International Instrumentation and Measurement Technology Conference (I2MTC), 205-209 (2012).

(56) References Cited

OTHER PUBLICATIONS

Wu et al, "Multivision oblique photogrammetry system calibration through the combination of 2D point and line control," Proc. SPIE 8006, 800607 (2011).
Ammons et al "Microarcsecond relative astrometry from the ground with a diffractive pupil," Proc. SPIE 8151, 81510T (2011).
Willneff et al "The calibration of wide-angle lens cameras using perspective and non-perspective projections in the context of real-time tracking applications," Proc. SPIE 8085, 80850S (2011).
Matsuoka et al "Calibration of low-cost measurement system by using a consumer digital stereo camera," Proc. SPIE 8085, 80850U (2011).
Zhou et al "A measurement error evaluation method of videometrics," Proc. SPIE 8194, 819424 (2011).
Grussenmeyer et al, "Accurate documentation in cultural heritage by merging TLS and high-resolution photogrammetric data," Proc. SPIE 8085, 808508 (2011).
Flood et al "System for robust bronchoscopic video distortion correction," Proc. SPIE 7964, 79641L (2011).
Liu et al "Autonomous on-orbit calibration of a star tracker camera", Opt. Eng. 50, 023604 (2011).
Xia et al, "Fully automatic matching of circular markers for camera calibration," Intelligent System and Knowledge Engineering, 2008. ISKE 2008. 3rd International Conference on Intelligent System and Knowledge Engineering, vol. 1,1065-1070 (2008).
Zhang et al, "Practical camera auto-calibration based on object appearance and motion for traffic scene visual surveillance," Computer Vision and Pattern Recognition,. CVPR. IEEE Conference, 1-8 (2008).
Deng et al, "Visual metrology with uncalibrated radial distorted images," Pattern Recognition, 2008. ICPR International Conference,1-4 (2008).
Yu et al "Camera calibration method used in computer vision coordinate measurement systems," Proc. SPIE 6829, 68291I(2007).
Hou et al "Self calibration of camera with non-linear imaging model," Proc. SPIE 6788, 67880Z (2007).
Chen et al "Accuracy improvement for 3D shape measurement system based on gray-code and phase-shift structured light projection," Proc. SPIE 6788, 67882C (2007).
Wu et al "Geo-registration and mosaic of UAV video for quick-response to forest fire disaster," Proc. SPIE 6788, 678810 (2007).
Duan et al "A method of camera calibration based on image processing," Proc. SPIE 6623, 66231Q (2007).
Gu et al "Research of the camera calibration based on digital image processing," Proc. SPIE 6696, 66961W (2007).
Lavigne et al "Fast Risley prisms camera steering system: calibration and image distortions correction through the use of a three-dimensional refraction model," Opt. Eng. 46, 043201 (2007).
Sodis-Szomoru et al "A Far-Range Off-line Camera Calibration Method for Stereo Lane Detection Systems," Instrumentation and Measurement Technology Conference Proceedings, 2007. IMTC 2007. IEEE , 1-6 (2007).
Hartley et al "Parameter-Free Radial Distortion Correction with Center of Distortion Estimation," IEEE Transactions pn Pattern Analysis and Machine Intelligence 29(8), 1309-1321(2007).
Orekhov et al; "Universal Camera Calibration with Automatic Distortion Model Selection," IEEE Int. Conference on image Processing ICIP, vol. 6, VI-397-VI-400 (2007).
Meijer et al "Multiple View Camera Calibration for Localization," Distributed Smart Cameras, 2007. ICDSC '07. First ACM/IEEE International Conference, 228-234 (2007).
Unal, G. et al, "A Variational Approach to Problems in Calibration of Multiple Cameras," IEEE Transactions on Pattern Analysis and Machine Intelligence 29(8),1322-1338 (2007).
Zhao et al "A Method of Calibrating the Intrinsic and Extrinsic Camera Parameters Separately for Multi-Camera Systems," International Conference on Machine Learning and Cybernetics, vol. 3, 1548-1553 (2007).

Kimura M. et al "Projector Calibration using Arbitrary Planes and Calibrated Camera," Computer Vision and Pattern Recognition, 2007. CVPR '07. IEEE Conference, 1-2 (2007).
Hongxia et al , "Non-metric CCD Camera Calibration for Low Attitude Photogrammetric Mapping," Electronic Measurement and Instruments, 2007. ICEMI '07. 8th International Conference on Electronic Measurement and Instruments,.2-689-2-696 (2007).
Nowakowski et al; "Lens Radial Distortion Calibration Using Homography of Central Points," EuroCon, 2007. The International Conference on "Computer as a Tool", 340-343 (2007).
Tardif et al; "Plane-based self-calibration of radial distortion," Computer Vision, 2007. ICCV 2007. IEEE 11th International Conference on Computer Vision, pp. 1-8, Rio de Janeiro, Brazil (Oct. 2007).
Sirisantisamrid K. et al "An Algorithm for Coplanar Camera Calibration," Intelligent Information Hiding and Multimedia Signal Processing, 2007. IIHMSP 2007. Third International Conference, vol. 1, 596-599 (2007).
Thomas et al "Camera Calibration for Fish-Eye Lenses in Endoscopy with an Application to 3d Reconstruction," 4th IEEE International Symposium on Biomedical Imaging: From Nano to Macro, 2007. ISBI 2007.,1176-1179 (2007).
Li, W. et al , "Beam based calibration for optical imaging device," 3DTV Conference, 1-4 (2007).
Qiujan et al, "Camera Calibration Method in Reverse Engineering," Automation and Logistics, 2007 IEEE International Conference on Automation and Logistics, 2936-2939 (Aug. 2007).
Dunne A.K. et al "Efficient Generic Calibration Method for General Cameras with Single Centre of Projection," IEEE 11th International Conference on Computer Vision ICCV, 1-8 (2007).
Mei et al "Single View Point Omnidirectional Camera Calibration from Planar Grids," IEEE International Conference on Robotics and Automation, 3945-3950 (2007).
Courbon et al; "A generic fisheye camera model for robotic applications," IEEE/RSJ International Conference on Intelligent Robots and Systems IROS,1683-1688 (2007).
Li et al,"A calibration method for a distance detection camera," Proc. SPIE 6358, 63580F (2006).
Wang et al, "A new method for linear camera calibration and nonlinear distortion correction," Proc. SPIE 6280, 62802O (2006).
Horbach et al "Metric projector camera calibration for measurement applications," Proc. SPIE 6382, 63820G (2006).
Huang et al "On improving the accuracy of structured light systems," Proc. SPIE 6382, 63820H (2006).
Xu et al, "Method for calibrating cameras with large lens distortion," Opt. Eng. 45, 043602 (2006).
Chen et al A new sub-pixel detector for grid target points in camera calibration. D. Chen, Y. Wang, and G. Zhang, Proc. SPIE 6027, 60272N (2006).
Xu et al "Accurate Camera Calibration with New Minimizing Function," IEEE International Conference on Robotics and Biomimetics, 779-784 (2006).
Wang et al "A New Calibration Model and Method of Camera Lens Distortion," Intelligent Robots and Systems, 2006 IEEE/RSJ International Conference on , 5713-5718, ( 2006).
Yanqing et at "A Flexible Camera Calibration Method for Computer Visual 3D Reconstruction System," Signal Processing, 2006 8th International Conference, vol. 2, (2006).
Gao et al "An Improved Two-Stage Camera Calibration Method,"The Sixth World Congress on Intelligent Control and Automation WCICA, vol. 2, 9514-9518 (2006).
Zhang et at "Complete Camera Calibration Using Line-Shape Objects," TENCON 2006. 2006 IEEE Region 10 Conference , 1-4 (2006).
Sirisantisamrid et al, "A Determination Method for Initial Values of Coplanar Camera Calibration Parameters," Circuits and Systems, 2006. APCCAS 2006. IEEE Asia Pacific Conference, 1067-1070 (2006).
Ramalingam et al; "A Factorization Based Self-Calibration for Radially Symmetric Cameras," 3D Data Processing, Visualization, and Transmission, Third International Symposium on on 3D Data Processing, Visualization and Transmission, Chapel Hill, NC, pp. 480-487 (2006).

(56) References Cited

OTHER PUBLICATIONS

Fernandes et al "Angle Invariance for Distance Measurements Using a Single Camera," Industrial Electronics, 2006 IEEE ISIE, Quebec, Canada, vol. 1, 676-680 (Jul. 2006).
Jung et al "Radial Distortion Refinement by Inverse Mapping-Based Extrapolation," Pattern Recognition, 2006. ICPR 2006. 18th International Conference on,on Pattern Recognition (ICPR'06), vol. 1., 675-678, (2006).
Hernandez et al "Real-Time Image Distortion Correction using FPGA-based System," IEEE Industrial Electronics IECON, nil7-nil11 (2006).
Xia et al "Easy calibration of a structured light vision system based on neural networks," Proc. SPIE 5856, 562 (2005).
Albert et al "Camera calibration for synthetic digital tomography," Proc. SPIE 5745, 1291 (2005).
Svoboda "A software for complete calibration of multicamera systems", Proc. SPIE 5685, 115 (2005).
Wang et al "Per-pixel camera calibration for 3D range scanning," Proc. SPIE 5665, 342 (2005).
Ahmed et al; "Nonmetric calibration of camera lens distortion: differential methods and robust estimation," IEEE Transactions on Image Processing, 14(8), 1215-1230 (2005).
Sirisantisamrid et al, "Determine Calibration Parameters with Satisfied Constraints for Coplanar Camera Calibration," TENCON 2005 2005 IEEE Region 10, (2005).
Vincent C.Y. et al "Multiview camera-calibration framework for nonparametric distortions removal," IEEE Transactions on Robotics 21(5), 1004-1009 (2005).
Leslie et al: "Surveillance, detection, and 3D infrared tracking of bullets, rockets, mortars, and artillery", Proceedings of SPIE, vol. 4393 : 193-201, XPO55230813, US (Sep. 27, 2001).
Steinvall: "Review of laser sensing devices and systems", Proceedings of SPIE, 5989 : 598903, US (Oct. 13, 2005).
Moore et al: "Counter sniper: a small projectile and gunfire localization system", Proceedings of SPIE, vol. 4232, Feb. 21, 2001 (Feb. 21, 2001).
Armada: "Iron Fist from IMI Unrivalled Active Protection System (APS) Against the Widest Range of Threats", (Sep. 3, 2007),XP055230918,Retrieved from the Internet: URL: https://web.archive.org/web/20070914014231/http://www.imi-israel.com/news.aspx?F01derID=73&d0cID=731 [retrieved on Nov. 24, 2015].
Holthaus: "Plattformschutz Hard- und Softkill-Systeme",Strategie & Technik, 18-23, (Nov. 1, 2011).
Tidhar et al: "",Proceedings of SPIE, 7660 : 7660OF (Apr. 23, 2010).
Castro et al "An effective camera calibration method," AMC International Workshop on Advanced Motion Control, 1998., 171-174 (1998).
Lee et al "Fine active calibration of camera position/orientation through pattern recognition," Industrial Electronics, 1998. Proceedings. ISIE '98. IEEE International Symposium on. 2 : 657-662 (Jul. 7-10, 1998).
Gumustekin et al "Image registration and mosaicing using a self-calibrating camera," 1998 International Conference on Image Processing ICIP, 1 : 818-822 (1998).
Cerveri et al "Calibration of TV cameras through RBF networks," Proc. SPIE 3165, 312 (1997).
Wang et al "Accurate and efficient image-intensifier distortion-correction algorithm and its application in volume tomographic angiography," Proc. SPIE 3032, 427 (1997).
Stein "Lens distortion calibration using point correspondences," IEEE Computer Society Conference on Computer Vision and Pattern Recognition, 602-608(1997).
Heikkila et al ; "A four-step camera calibration procedure with implicit image correction," IEEE Computer Society Conference onComputer Vision and Pattern Recognition, 1997. Proceedings. ,1106-1112 (1997).
Bacakoglu et al ; "A three-step camera calibration method," IEEE Transactions on Instrumentation and Measurement 46(5), 1165-1172(1997).
Bacakoglu et al "An optimized two-step camera calibration method," IEEE International Conference on Robotics and Automation, 2 : 1347-1352 (1997).
Korechoff et al "Distortion calibration of the MISR linear detectors," Proc. SPIE 2820, 174 (1996).
Zhou et al "Distortion model selecting and accuracy evaluation for CCD camera calibration," International Conference on Signal Processing, 2 : 875-878 (1996).
Heikkila et al "Calibration procedure for short focal length off-the-shelf CCD cameras," International Conference on Pattern Recognition, 1 : 166-170 (1996).
Li et al "Some aspects of zoom lens camera calibration," IEEE Transactions on Pattern Analysis and Machine Intelligence 18(11), 1105-1110 (1996).
Asada et al "Photometric calibration of zoom lens systems," Proceedings of the 13th International Conference on Pattern Recognition, 1 : 186-190 (1996).
Alpheus , "Zoom lens calibration for wind tunnel measurements," Proc. SPIE 2598, 19 (1995).
Fraser et al "Multisensor system self-calibration," Proc. SPIE 2598, 2 (1995).
Devernay et al "Automatic calibration and removal of distortion from scenes of structured environments," Proc. SPIE 2567, 62 (1995).
Stein G.P.; "Accurate internal camera calibration using rotation, with analysis of sources of error," Fifth International Conference on Computer Vision, 1995. Proceedings, 230-236 (1995).
Seetharaman et al "A fast and simple method to calibrate scale factor using telephoto lens," IEEE International Symposium on Intelligent Control, 326-331 (1995).
Zhuang et al "A note on "On single-scanline camera calibration" [and reply]," IEEE Transactions on Robotics and Automation, 11(3), 470-471 (1995).
Melen et al "Modeling and calibration of video cameras," Proc. SPIE 2357, 569 (1994).
Shah et al , "A simple calibration procedure for fish-eye (high distortion) lens camera," 1994 IEEE International Conference on Robotics and Automation. 4 : 3422-3427 (1994).
Wei et al "Implicit and explicit camera calibration: theory and experiments," IEEE Transactions on Pattern Analysis and Machine Intelligence 16(5), 469-480 (1994).
Roberts et al "A genetic algorithm approach to camera calibration in 3D machine vision," IEE Colloquium on Genetic Algorithms in Image Processing and Vision, 12/1-12/5 (1994).
Godding "Photogrammetric method for the investigation and calibration of high-resolution camera systems," Proc. SPIE 1987, 103 (1993).
Masmoudi et al "Stereo camera calibration with distortion model and using forgetting factor," Proc. SPIE 2067, 14 (1993).
Fan et al, "High-performance camera calibration algorithm," Proc. SPIE 2067, 2 (1993).
Jansa et al "Problems of precise target location and camera orientation in digital close-range photogrammetry," Proc. SPIE 2067, 151 (1993).
Chatterjee et al "Robust camera calibration under complete lens distortion," Proc. SPIE 2028, 322 (1993).
Lai "Sensitivity of camera calibration," Proc. SPIE 1822, 74 (1993).
Shih et al "Accurate linear technique for camera calibration considering lens distortion by solving an eigenvalue problem," Opt. Eng. 32, 138 (1993).
Zhuang et al "Simultaneous calibration of a robot and a hand-mounted camera," IEEE International Conference on Robotics and Automation, vol. 2,149-154(1993).
Wagner, G.; "Measuring accurately—does your calibration technique get the job done?", Northcon/93. Conference Record, 32-37 (1993).
Wei et al "A complete two-plane camera calibration method and experimental comparisons," International Conference on Computer Vision, 439-446 (1993).
McLean, G.; "Image warping for calibration and removal of lens distortion," Communications, IEEE Pacific Rim Conference on Computers and Signal Processing, 1 : 170-173 (1993).

(56) References Cited

OTHER PUBLICATIONS

Shin et al "Efficient and accurate camera calibration technique for 3-D computer vision," Proc. SPIE 1614, 133 (1992).
Shin et al "Accuracy assessment on camera calibration method not considering lens distortion," Proceedings CVPR IEEE Computer Society Conference on Computer Vision and Pattern Recognition, 755-757 (1992).
Kawahara et al "Scene reconstruction from distorted images using self-calibration of camera parameters," Proc. SPIE 1614, 159 (1992).
Nomura et al "Simple calibration algorithm for high-distortion lens camera," IEEE Transactions on Pattern Analysis and Machine Intelligence, 14(11), 1095-1099 (1992).
Weng et al "Camera calibration with distortion models and accuracy evaluation," IEEE Transactions on Pattern Analysis and Machine Intelligence, 14(10), 965-980 (1992).
Bruzzone et al, "Calibration of a CCD camera on a hybrid coordinate measuring machine for industrial metrology," Proc. SPIE 1526, 96 (1991).
Wei, G.-Q.; et al "Two plane camera calibration: a unified model," IEEE Computer Society Conference on Computer Vision and Pattern Recognition CVPR, 133-138 (1991).
Penna, M.A.; "Camera calibration: a quick and easy way to determine the scale factor," IEEE Transactions on Pattern Analysis and Machine Intelligence, 13(12), 1240-1245 (1991).
Weng et al "Calibration of stereo cameras using a non-linear distortion model [CCD sensory]," International Conference on Pattern Recognition, vol. i, 246-253 (1990).
Grosky et al "A unified approach to the linear camera calibration problem," IEEE Transactions on Pattern Analysis and Machine Intelligence, 12(7), 663-671 (1990).
Li, J.C.; et al "An accurate camera calibration for the aerial image analysis," Pattern Recognition, 1990. Proceedings., 10th International Conference on , vol. 1, 207-209 (1990).
Puskorius et al, "Camera calibration methodology based on a linear perspective transformation error model," Robotics and Automation, 1988. Proceedings., 1988 IEEE International Conference on ,.1858-1860 vol. 3, Apr. 24-29, 1988.
Špiclin et al, (Feb. 2010). Geometrical calibration of an AOTF hyper-spectral imaging system. In BiOS(pp. 75560I-75560I). International Society for Optics and Photonics.
Xie et al "Pseudo-Gabor wavelet for face recognition" Journal of electronic Imaging. 22 (2) (Apr.-Jun. 2013).
Dunpont et al "3D triangulation system based on out-of-axis aperture configuration for micro-scaled objects shape measurement," Proc. SPIE 7932, 79320F (2011).
Keane et al "Unsupervised automated panorama creation for realistic surveillance scenes through weighted mutual information registration," Proc. SPIE 7870, 78700T (2011).
Li et al "Camera calibration with a near-parallel imaging system based on geometric moments," Opt. Eng. 50, 023601 (2011).
Li et al "CCD camera linear calibration method with a feature of calibration plate," 2011 International Conference on Transportation, Mechanical, and Electrical Engineering (TMEE) pp. 2274-2277 (2011).
Von Gioi et al "Lens distortion correction with a calibration harp," IEEE International Conference on Image Processing (ICIP), 617-620 (2011).
Feng et al "A calibration methods for Vision measuring system with large view field," 4th International Congress on Image and Signal Processing (CISP) vol. 3, 1377-1380 (2011).
Chen et al "The research of camera distortion correction basing on neural network," Chinese Control and Decision Conference (CCDC), 596-601 (2011).
Zhang et al "Design and implementation of camera calibration system based on OpenCV," International Conference on Electric Information and Control Engineering (ICEICE), 3110-3113 (2011).
Jiang et al "Research on camera self-calibration of highprecision in binocular vision," International Conference on Application of Information and Communication Technologies (AICT), 1-5 (2011).
Li et al "Generic radial distortion calibration of a novel single camera based panoramic stereoscopic system," IEEE International Conference on Robotics and Automation (ICRA), 6294-6299 (2011).
Fernandez et al "Planar-based camera-projector calibration," International Symposium on Image and Signal Processing and Analysis (ISPA), 633-638 (2011).
Sirisantisamrid et al "A technique of camera calibration using single view," International Conference on Control, Automation and Systems (ICCAS), 1486-1490 (2011).
Fujiki, J, et al "Calibration of radially symmetric distortion based on linearity in the calibrated image," IEEE International Conference on Computer Vision Workshops (ICCV Workshops), 288-295 (2011).
Zhang et al "Camera calibration with lens distortion from low-rank textures," IEEE Conference on Computer Vision and Pattern Recognition (CVPR), 2321-2328 (2011).
Brauers J et al "Geometric Calibration of Lens and Filter Distortions for Multispectral Filter-Wheel Cameras," IEEE Transactions on Image Processing, 20(2), 496-505 (2011).
Hongzhi et al "The distortion correction of large view wide-angle lens for image mosaic based on OpenCV," International Conference on Mechatronic Science, Electric Engineering and Computer (MEC), 1074-1077 (2011).
Fang et al "A geometric method for calibration of the image center," International Conference on Advanced Mechatronic Systems (ICAMechS), 6-10 (2011).
Chai "Design and implementation of two camera's calibration based on directshow," IEEE 3rd International Conference on Communication Software and Networks (ICCSN), 603-606 (2011).
Yang et al, "Accurate and efficient characterization of streak camera using etalon and fitting method with constraints," Review of Scientific Instruments 82(11), 113501-113501-5 (2011).
Cai et al "An algorithm for computing extrinsic camera parameters for far-range photogrammetry based on essential matrix," Proc. SPIE 7850, 78501Y (2010).
Yin et al "Calibration target reconstruction for 3-D vision inspection system of large-scale engineering objects," Proc. SPIE 7855, 78550V (2010).
Liu et al "Distortion model for star tracker," Proc. SPIE 7544, 75445T (2010).
Liu et al "Novel approach for laboratory calibration of star tracker," Opt. Eng. 49, 073601 (2010).
Cai et al "Fast-camera calibration of stereo vision system using BP neural networks," Proc. SPIE 7658, 76585B (2010).
Banish et al "Exploiting uncalibrated stereo on a UAV platform", Proc. SPIE 7692, 76921T (2010).
Ding et al "Approach for Calibration of Digital Camera Distortion Based on Non-Control Field," International Conference on Information Engineering and Computer Science (ICIECS), 1-4 (2010).
Swapna P. et al "A novel technique for estimating intrinsic camera parameters in geometric camera calibration," 2010 23rd Canadian Conference on Electrical and Computer Engineering (CCECE), 1-7 (2010).
Xuejun et al "A New Camera Calibration Method Based on Two Stages Distortion Model," International Conference of Information Science and Management Engineering (ISME), vol. 2, 125-129 (2010).
Zhang et al "Digital camera calibration method based on PhotoModeler," International Congress on Image and Signal Processing (CISP), vol. 3, 1235-1238 (2010).
Wu et al "Nonmetric calibration of camera lens distortion using concentric circles pattern," International Conference on Mechanic Automation and Control Engineering (MACE), 3338-3341 (2010).
Kim et al "Camera lens radial distortion compensation by illuminating the epipolar lines with a projector," International Conference on Control Automation and Systems (ICCAS), 1871-1874 (2010).
Waizenegger W. et al "Calibration of a synchronized multi-camera setup for 3D videoconferencing," 3DTV-Conference: The True Vision—Capture, Transmission and Display of 3D Video (3DTV-Con), 1-4 (2010).
Kim et al "Wide-angle laser structured light system calibration with a planar object," , 2010 International Conference on Control Automation and Systems (ICCAS), 1879-1882 (2010).

(56) References Cited

OTHER PUBLICATIONS

Tamersoy B. et al "Exploiting Geometric Restrictions in a PTZ Camera for Finding Point-correspondences Between Configurations," IEEE International Conference on Advanced Video and Signal Based Surveillance (AVSS), 488 (2010).
Friel M et al "Automatic calibration of fish-eye cameras from automotive video sequences," Intelligent Transport Systems IET 4(2), 136-148 (2010).
Lu et al, "A new method for improving camera calibration precision," International Conference on Computer Application and System Modeling (ICCASM), vol. 3, V3-650-V3-654 (2010).
Gao et al "A method of spatial calibration for camera and radar," World Congress on Intelligent Control and Automation (WCICA),6211-6215 (2010).
Xingfang et al, "A simple camera calibration method based on sub-pixel corner extraction of the chessboard image," IEEE International Conference on Intelligent Computing and Intelligent Systems (ICIS), vol. 3,688-692 (2010).
Pan et al "A Novel Method for the Distortion Modification of Camera Lens," International Conference on Optoelectronics and Image Processing (ICOIP), vol. 1, 92-95 (2010).
Wang, Y. M. et al "A camera calibration technique based on OpenCV,", International Conference on Information Sciences and Interaction Sciences (ICIS),403-406 (2010).
Fujiki J. et al "Self-Calibration of Radially Symmetric Distortion by Model Selection," Int. Conference on Pattern Recognition (ICPR) 1812-1815 (2010).
Altinay D et al "On the Estimation of Extrinsic and Intrinsic Parameters of Optical Microscope Calibration," International Conference on Digital Image Computing: Techniques and Applications (DICTA), 190-195 (2010).
Zhu et al "Omnidirectional camera calibration based on an approximate factorization method," 2010 8th World Congress on Intelligent Control and Automation (WCICA), 6388-6393 (2010).
Yimin et al "A novel approach to sub-pixel corner detection of the grid in camera calibration," International Conference on Computer Application and System Modeling (ICCASM), V5-18-V5-21 (2010).
Wang et al "Calibration Research on Fish-eye lens," IEEE International Conference on Information and Automation (ICIA), 385-390 (2010).
Shen et al "Star sensor on-orbit calibration using Extended Kalman Filter," International Symposium on Systems and Control in Aeronautics and Astronautics (ISSCAA), 958-962 (2010).
Wei et al "A Two-Dimensional Sub-Pixel Edge Detection Algorithm Based on Hyperbolic Tangent," International Conference on Information Engineering and Computer Science (ICIECS), 1-4 (2010).
Sui et al "Camera calibration method based on bundle adjustmentm" Proc. SPIE 7522, 75225D (2009).
Yu et al "Research on distortion measurement and calibration technology for TV-seeker," Proc. SPIE 7511, 75111U (2009).
Nie et al "Camera calibration method with a coplanar target and three-dimensional reconstruction," Proc. SPIE 7513, 75132W (2009).
Tu et al,"New calibration technique for a novel stereo camera," Proc. SPIE 7432, 743205 (2009).
Chikatsu et al "Comparative evaluation of consumer grade cameras and mobile phone cameras for close range photogrammetry," Proc. SPIE 7447, 74470H (2009).
Yanagi et al Yanagi and H. Chikatsu, "Performance evaluation of macro lens in digital close range photogrammetry," Proc. SPIE 7447, 74470J (2009).
Wu et al "Unwarping of images taken by misaligned omnicameras without camera calibration by curved quadrilateral morphing using quadratic pattern classifiers," Opt. Eng. 48, 087003 (2009).
Yu et al "Distortion measurement and calibration technology research of automatic observing and aiming optical system based on CCD," Proc. SPIE 7283, 728319 (2009).
He et al "Camera calibration with lens distortion and from vanishing points," Opt. Eng. 48, 013603 (2009).

Liu et al "A geometry calibration and visual seamlessness method based on multi-projector tiled display wall," Proc. SPIE 7242, 72421C (2009).
Lin et al "Enhanced calibration method for camera distortion," IEEE ICCAS-SICE, 1115-1120 (2009).
Pal et al "Star camera calibration combined with independent spacecraft attitude determination," American Control Conference, 4836-4841 (2009).
Tardif et al "Calibration of Cameras with Radially Symmetric Distortion," IEEE Transactions on Pattern Analysis and Machine Intelligence 31(9), 1552-1566 d(2009).
Xiaobo et al "A new classic camera calibration method based on coplanar Points," CCDC Chinese Control and Decision Conference, 4481-4485 (2009).
Gao et al "Research of camera calibration algorithm based on 3D re-projective error," Industrial Electronics and Applications, 2009. ICIEA 2009. 4th IEEE Conference on , vol., No., pp. 3800-3804, May 25-27, 2009.
Douxchamps et al "High-Accuracy and Robust Localization of Large Control Markers for Geometric Camera Calibration," IEEE Transactions on Pattern Analysis and Machine Intelligence 31(2), 376-383 (2009).
Wei et al "Nonlinear optimization method in camera calibration," International Conference on Electronic Measurement & Instruments ICEMI , 2-459-2-461 (2009).
Garibotto G.B.; et al "A New Optical Distortion Model for Multi-camera Calibration," Advanced Video and Signal Based Surveillance, 2009. AVSS '09. Sixth IEEE International Conference on, 508-513 (2009).
Albitar et al ; "Calibration of vision systems based on pseudo-random patterns," Intelligent Robots and Systems, 2009. IROS 2009. IEEE/RSJ International Conference on, 321-326 (2009).
Xie et al "Accurate pose and location estimation of uncalibrated camera in urban area," 2009 IEEE International, IGARSS 2009 Geoscience and Remote Sensing Symposium, vol. 4,IV-406-IV-409 (2009).
Zhang et al "On Improved Single Viewpoint Constraint Calibration for Catadioptric Omnidirectional Vision," CISP International Congress on Image and Signal Processing, 1-5 (2009).
Liu et al "Accurate camera calibration using the collinearity constraint," IEEE International Symposium on Computational Intelligence in Robotics and Automation (CIRA), 334-339 (2009).
Ya-Hui et al "A Geometry Calibration and Visual Seamlessness Method Based on Multi-projector Tiled Display Wall," Informatics in Control, Automation and Robotics, 2009. CAR '09. International Asia Conference on, 450-453 (2009).
Ma et al "A Curve-Fitting Method for Correcting Radial Distortion," Image and Signal Processing, 2009. CISP '09. 2nd International Congress on, 1-4 (2009).
Zhu et al "Fisheye Camera Calibration with Two Pairs of Vanishing Points," Information Technology and Computer Science, 2009. ITCS 2009. International Conference on, vol. 1, 321-324 (2009).
Ikram-Ul-Haq et al; "Two stage camera calibration modeling and simulation," Applied Sciences and Technology (IBCAST), 2009 6th International Bhurban Conference on, 231-237 (2009).
Douterioigne K. et al "Fully automatic and robust UAV camera calibration using chessboard patterns," Geoscience and Remote Sensing Symposium,2009 IEEE International, IGARSS 2009, vol. 2, II-551-II-554 (2009).
Zheng et al "Estimation of projected circle centers from array circles and its application in camera calibration," Computational Intelligence and Industrial Applications, 2009. PACIIA 2009. Asia-Pacific Conference on, vol. 1, 182-185 (2009).
Strobl et al "On the issue of camera calibration with narrow angular field of view," IEEE/RSJ International Conference on Intelligent Robots and Systems, 309-315 (2009).
Qiqiang et al; "Combination Calibration of Digital Cameras," International Conference on Information Engineering and Computer Science ICIECS, 1-4 (2009).
Josephson et al; "Pose estimation with radial distortion and unknown focal length," IEEE Conference on Computer Vision and Pattern Recognition CVPR , 2419-2426 (2009).

(56) References Cited

OTHER PUBLICATIONS

Kawano, H et al "Generation of panoramic image based on planar image features using side-view in-vehicle camera," ICCAS-SICE, 2009, 4007-4010, (2009).
Bayard D.S. et al "Focal plane calibration of the Spitzer space telescope," IEEE Control Systems, 29(6),47-70 (2009).
Qin et al "Test-range calibration of digital camera's inner parameters," Proc. SPIE 7130, 71303B (2008).
Zhang et al "Improved robust and accurate camera calibration method used for machine vision application", Opt. Eng. 47, 117201 (2008).
Zhou et al "Accurate detection and automatic match method for feature points using concentric circles array", Proc. SPIE 7129, 71290C (2008).
Li et al "Camera calibration of the stereo vision measurement system," Proc. SPIE 7018, 70183N (2008).
Robbins et al "Photogrammetric calibration of the SwissRanger 3D range imaging sensor," Proc. SPIE 7003, 700320 (2008).
Chtchetinine, "Radial distortion in low-cost lenses: numerical study," Opt. Eng. 47, 023001 (2008).
Okubo et al "Accurate camera calibration method specialized for virtual studios," Proc. SPIE 6804, 68040F (2008).
Wojtek et al "Efficient calibration algorithm, and calibration pattern for correcting distortions for three-dimensional image acquisition systems for microscopic applications", Proc. SPIE 6861, 68610S (2008).
Thanasas et al, "Correcting spatial distortion and non-uniformity in planar images from γ-Camera systems," Nuclear Science Symposium Conference Record, 2008. NSS '08. IEEE , vol., No., pp. 3711-3714, Oct. 19-25, 2008.
Quan et al "Correction of the Asymmetrical Circular Projection in DLT Camera Calibration," Image and Signal Processing, 2008. CISP '08. Congress on Image and Signal Processing, vol. 2, No., pp. 344-348, May 27-30, 2008.
Kim et al "Camera calibration method under poor lighting condition in factories," Control, Automation and Systems, 2008. ICCAS 2008. International Conference on Control, Automation and Systems,. 2162-2166 (Oct. 2008).
Liu et al "Camera calibration based on divided region LS-SVM," IEEE International Conference on Mechatronics and Automation, 2008. ICMA 2008., 488-492 (2008).
Matsuura et al "A simple technique for coplanar camera calibration," Control, Automation and Systems, 2008. ICCAS 2008. International Conference on Control, Automation and Systems, pp. 2787-2790, Oct. 2008.
Peng et al "Camera modeling and distortion calibration for mobile robot vision," World Congress on Intelligent Control and Automation WCICA, 1657-1662 (2008).
Yang, Z.J. et al "A novel camera calibration method based on genetic algorithm," IEEE Conference on Industrial Electronics and Applications ICIEA,2222-2227 (2008).
Dongtai et al, "Planar Visual Metrology using Partition-based Camera Calibration," Robotics, Automation and Mechatronics, 2008 IEEE Conference on ,205-209 (2008).
Sirisantisamrid et al "An influential principal point on camera parameters," Control, Automation and Systems, 2008. ICCAS 2008. International Conference on , 2797-2800 (2008).
Nave T. et al, "Global featureless estimation of radial distortions," Signal Processing and Communication Systems, 2008. ICSPCS 2008. 2nd International Conference on , 1-11(2008).
Gao et al "An improved two-stage camera calibration method based on evolution calculation," 7th World Congress on Intelligent Control and Automation WCICA,8471-8476 (2008).
Pan et al "The Calibration of Perspective picture Based on Vanishing Point," Image and Signal Processing, 2008. CISP '08. 2008 Congress on Image and Signal Processing, vol. 2.417-421 (2008).
Thirthala et al "Calibration of pan-tilt-zoom (PTZ) cameras and omni-directional cameras," Computer Vision and Pattern Recognition, 2005. CVPR 2005. IEEE Computer Society Conference, vol. 2, 1198 (2005).
Hartley et al "Parameter-free radial distortion correction with centre of distortion estimation," Computer Vision, 2005. ICCV 2005. Tenth IEEE International Conference on Computer Vision (ICCV'05), vol. 2, 1834-1841 (2005).
Shu et al "Precise online camera calibration in a robot navigating vision system," Mechatronics and Automation, 2005 IEEE International Conference on Mechatronics & Automation Niagara Falls, Canada, vol. 3, 1277-1282 (Jul. 2005).
Li et al "Auto-Calibration of a Compound-Type Omnidirectional Camera," Digital Image Computing: Techniques and Applications, 2005. DICTA '05. Proceedings 2005, p. 26 (2005).
Claus et al "A rational function lens distortion model for general cameras," IEEE Computer Society Conference on Computer Vision and Pattern Recognition, CVPR, vol. 1, 213-219 (2005).
Thirthala et al;"Multi-view geometry of 1D radial cameras and its application to omnidirectional camera calibration," IEEE Int. Conference on Computer Vision ICCV, vol. 2, 1539-1546 (2005).
Graf et al "Analytically solving radial distortion parameters," IEEE Computer Society Conference on Computer Vision and Pattern Recognition, CVPR, vol. 2, 1104-1109 (2005).
Wu et al "Lens distortion calibration by explicit straight-line to distorted-line geometric mapping," Proc. SPIE 5603, 162 (2004).
Deng et al "A calibration method using only one plane for 3D machine vision," Proc. SPIE 5303, 52 (2004).
Li et al "A high accuracy camera calibration for vision-based measurement systems," WCICA World Congress on Intelligent Control and Automation, vol. 4, 3730-3733 (2004).
Benhimane et al "Self-calibration of the distortion of a zooming camera by matching points at different resolutions," IEEE/RSJ International Conference on Intelligent Robots and Systems, vol. 2, 2307-2312 (2004).
Sirisantisamrid et al "A simple technique to determine calibration parameters for coplanar camera calibration," IEEE TENCON Conference, vol. A, 677-680 (2004).
Yang et al "An image correction-based approach to camera calibration," Machine Learning and Cybernetics, 2004. Proceedings of 2004 International Conference on , vol. 6, No., pp. 3751-3754 vol. 6, Aug. 26-29, 2004.
Miranda-Luna et al "A simplified method of endoscopic image distortion correction based on grey level registration," I ICIP '04. 2004 International Conference on Image Processing (UP), vol. 5, No., pp. 3383-3386 vol. 5, Oct. 24-27, 2004.
Zheng et al "Calibration of linear structured light system by planar checkerboard," Information Acquisition, 2004. Proceedings. International Conference, 344-346 (2004).
Meng et al "What you see is what you get [self-calibrating camera lens distortion]," IEEE Robotics & Automation Magazine 11(4), 123-127 (2004).
Li et al "Robocup field distortion calibration with variational image registration," Intelligent Multimedia, Video and Speech Processing, 2004. Proceedings of 2004 International Symposium, vol., No., pp. 338-341, Oct. 20-22, 2004.
Hendricks et al "Accurate and robust marker localization algorithm for camera calibration," Proceedings. First International Symposium on 3D Data Processing Visualization and Transmission (3DP * 02), 522-525 (2002).
Jeong et al "Study on the camera calibration parameters estimation using the perspective variation ratio". Junik Jeong, HoSoon Lee, and DoHwan Rho, Proc. SPIE 5267, 145 (2003).
Yalla et al "Multispot projection, tracking, and calibration." Veera Ganesh Yalla, Wei Su, and Laurence G. Hassebrook, Proc. SPIE 5106, 221 (2003).
Habib et al, "Automatic calibration of low-cost digital cameras". Ayman F. Habib, Associate Professor, and Michel F. Morgan, Opt. Eng. 42, 948 (2003).
Gerhardt et al "Calibration of geometric distortion in the ACS detectors," Proc. SPIE 4854, 507 (2003).
Xu J. et al ; "Comparative study of two calibration methods on fundus camera," International Conference of the IEEE Engineering in Medicine and Biology Society, vol. 1, 576-579 (2003).
Micusik et al; "Estimation of omnidirectional camera model from epipolar geometry," IEEE Computer Society Conference on Computer Vision and Pattern Recognition, vol. 1, I-485-I-490 (2003).

(56) References Cited

OTHER PUBLICATIONS

Yu et al "A calibration-free lens distortion correction method for low cost digital imaging," International Conference on Image Processing ICIP, vol. 1, I-813-6(2003).

Yu et al "An embedded camera lens distortion correction method for mobile computing applications," IEEE International Conference on Consumer Electronics ICCE., 400-401 (2003).

Lucchese et al, "Correction of geometric lens distortion through image warping," International Symposium on Image and Signal Processing and Analysis ISPA., vol. 1, 516-521 (2003).

Porikli et al, "Multi-camera calibration, object tracking and query generation," International Conference on Multimedia and Expo, ICME., vol. 1, I-653-6 (2003).

El-Melegy et al; "Statistically Robust Approach to Lens Distortion Calibration with Model Selection," Conference on Computer Vision and Pattern Recognition Workshop, CVPRW, vol. 8, 91 (2003).

El-Melegy et al; "Nonmetric lens distortion calibration: closed-form solutions, robust estimation and model selection," Ninth IEEE International Conference on Computer Vision, 554-559 (2003).

Porikli, F.; "Inter-camera color calibration by correlation model function," International Conference on Image Processing ICIP, vol. 2, II-133-6(2003).

Rueckert et al "Automated camera calibration for image-guided surgery using intensity-based registration", Proc. SPIE 4681, 463 (2002).

Nakano et al "Camera calibration with precise extraction of feature points using projective transformation," IEEE International Conference on Robotics and Automation ICRA, vol. 3, 2532-2538 (2002).

Shahidi et al "Implementation, calibration and accuracy testing of an image-enhanced endoscopy system," IEEE Transactions on Medical Imaging 21(12), 1524-1535 (2002).

Jeong et al ; "A study on the flexible camera calibration method using a grid type frame with different line widths," SICE 2002. Proceedings of the 41st SICE Annual Conference, vol. 2, 1319-1324 (2002).

Donaldson et al "A self-calibrating, multichannel streak camera for inertial confinement fusion applications," Review of Scientific Instruments 73(7), 2606-2615 (2002).

Zheng et al "A high-precision camera operation parameter measurement system and its application to image motion inferring," IEEE Transactions on Broadcasting 47(1), 46-55 (2001).

Brauer-Burchardt et al "A new algorithm to correct fish-eye- and strong wide-angle-lens-distortion from single images," International Conference on Image Processing, vol. 1, 225-228 (2001).

Jiar et al "Fish-eye lens camera nonlinear calibration for stereo vision system", Proc. SPIE 4117, 280 (2000).

Tordoff et al; "Violating rotating camera geometry: the effect of radial distortion on self-calibration," International Conference on Pattern Recognition, vol. 1, 423-427 (2000).

Zhang et al "Nonlinear distortion correction in endoscopic video images," International Conference on Image Processing, 2000, vol. 2 439-442 (2000).

Swaminathan et al "Nonmetric calibration of wide-angle lenses and polycameras," IEEE Transactions on Pattern Analysis and Machine Intelligence, 22(10), 1172-1178 (2000).

Heikkila, "Geometric camera calibration using circular control points," IEEE Transactions on Pattern Analysis and Machine Intelligence, 22(10), 1066-1077 (2000).

Moumen et al "Camera calibration with lens distortion using weakly localized image features," Proc. SPIE 3650, 119 (1999).

Batista et al "Iterative multistep explicit camera calibration," IEEE Transactions on Robotics and Automation, 15(5), 897-917 (1999).

Jun et al "Robust camera calibration using neural network," IEEE TENCON 99 Conference, vol. 1, 694-697 (1999).

Asari et al "A new approach for nonlinear distortion correction in endoscopic images based on least squares estimation," IEEE Transactions on Medical Imaging 18(4), 345-354(1999).

Tomasi et al; "How to rotate a camera," International Conference on Image Analysis and Processing, 606-611 (1999).

Swaminathan et al "Non-metric calibration of wide-angle lenses and polycameras," IEEE Computer Society Conference on. Computer Vision and Pattern Recognition, vol. 2, 2 (1999).

Wang et al, "Accurate and efficient image intensifier distortion correction algorithm for volume tomographic angiography," Opt. Eng. 37, 977 (1998).

\* cited by examiner

| Parameter | RADAR | | Optics | |
|---|---|---|---|---|
| Aperture (∅) required for 1mrad angular resolution | X-band 8–12GHz ($\lambda$ ~2.50–3.75cm) ~37m<br>$K_u$-band 12–18GHz ($\lambda$ ~1.67–2.50cm) ~25m<br>$K_a$-band 24–40GHz ($\lambda$ ~0.75–1.11cm) ~11m | | LWIR ($\lambda$ ~8-14μm)<br>MWIR ($\lambda$ ~3-5μm)<br>SWIR ($\lambda$ ~1-2.5μm) | ~0.030m<br>~0.010m<br>~0.005m |
| Receiver signal | $P_\gamma = \dfrac{\sigma \cdot P_t \cdot F^4}{(4\pi)^2} \dfrac{A_\gamma \cdot G_\gamma}{R^4}$ | | $P_\gamma = J_{obs} \dfrac{A_\gamma \cdot G_\gamma}{R^2 / \tau_{opt}(R)}$ | |
| Range measurement | Very accurate – pulse Time of Flight measurement | | Difficult. Only by means of triangulation from multiple viewpoints, or - passive ranging with signal processing from multiple optical band. | |
| Velocity measurement | Very accurate – Doppler effect measurement | | Difficult. Only by means of triangulation from multiple viewpoints. | |
| Weather dependency | Weak | | Strong. Inoperable in dense fog and clouds. | |

FIG. 1

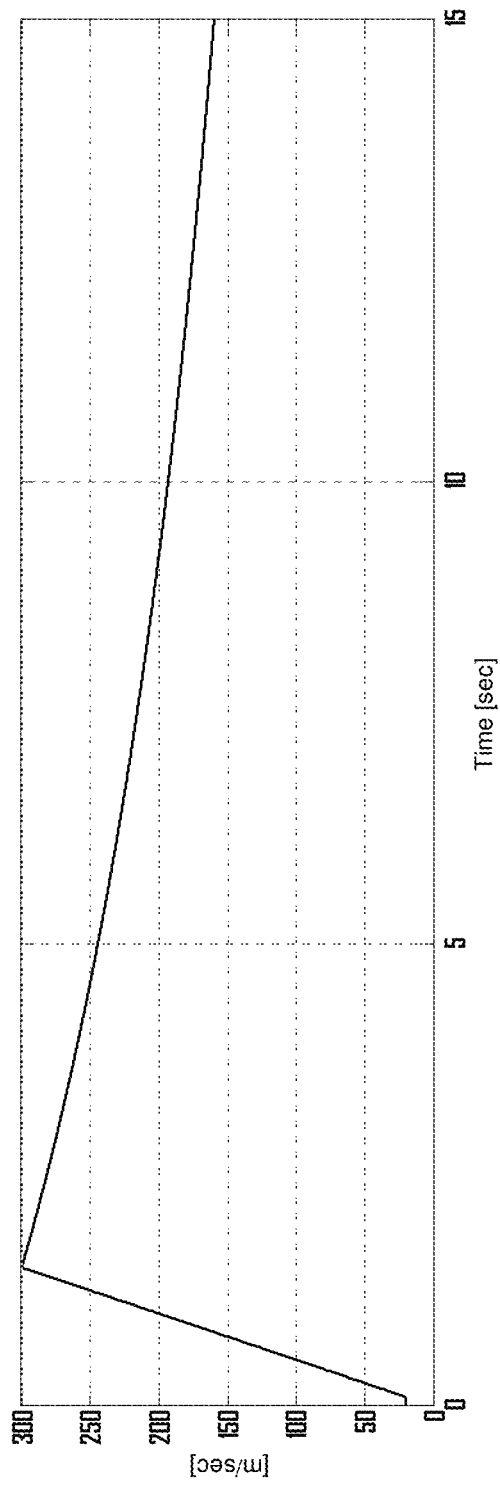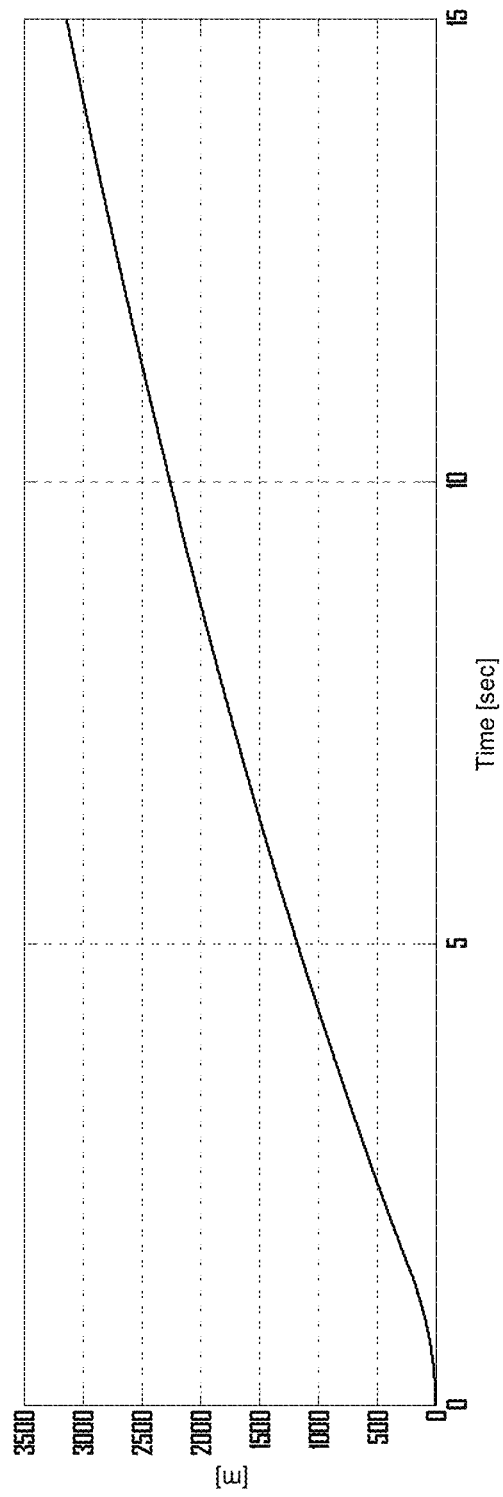
FIG. 4

ESTIMATING A SOURCE LOCATION OF A PROJECTILE

FIELD OF THE INVENTION

The present invention is in the field of optical and radar signal processing.

REFERENCES TO RELATED PUBLICATIONS

Fusion of optics and radar was discussed in the following publications:
[1] Langer D., Jochem T., "Fusing radar and vision for detecting, classifying and avoiding roadway obstacles," Proc. of Conf. on Intelligent Vehicles (2000)
[2] Blackman S. S., Dempster R. J., Roszkowski S. H., Sasaki D. M., Singer P. F., "Improved tracking capability and efficient radar allocation through the fusion of radar and infrared search-and-track observations," Optical Engineering 39(5), 1391-1398 (2000)
[3] A., Kester L., van den Broek S., van Dorp P., and van Sweeden R., "The FRESNEL Program: Fusion of Radar and Electro-optical Signals for Surveillance on Land," Proc. SPIE 4380, 453-461 (2001)
[4] Kester L. and Theil A., "Fusion of Radar and EO-sensors for Surveillance," Proc. SPIE 4380, 462-471 (2001)
[5] A. Gem, U. Franke, and P. Levi, "Robust vehicle tracking fusing radar and vision," in Proc. Int. Conf. Multisensor Fusion Integr. Intell. Syst., 323-328 (2001)
[6] Birkemark C. M. and Titley J. D., "Results of the DRIVE I experiment for fusion of IR and Radar Data," Proc. SPIE 4380, 472-479 (2001)
[7] B. Steux, C. Laurgeau, L. Salesse, and D. Wautier, "Fade: A vehicle detection and tracking system featuring monocular color vision and radar data fusion," in Proc. IEEE Intell. Vehicles Symp., 632-639 (2002)
[8] Y. Fang, I. Masaki, and B. Horn, "Depth-based target segmentation for intelligent vehicles: Fusion of radar and binocular stereo," IEEE Trans. Intell. Transp. Syst. 3(3), 196-202 (2002)
[9] Scholz T. K., Förster J., "Environmental characterization of the marine boundary layer for electromagnetic wave propagation", Proc. SPIE 4884, 71-78 (2003)
[10] Whitehead P. G., Bernhardt M., Hickman D., Dent C., "Range and brightness fusion: using radar and electro-optical data association for tracking small objects," Proc. SPIE 5096, 423-431(2003)
[11] N. Kawasaki and U. Kiencke, "Standard platform for sensor fusion on advanced driver assistance system using Bayesian network," Proc. IEEE Intell. Vehicles Symp. 240-255 (2004)
[12] N. Yonemoto, K. Yamamoto, and K. Yamada, "A new color, IR, and radar data fusion for obstacle detection and collision warning," Proc. SPIE 5424, 73-80 (2004)
[13] Schultz J., Gustafsson U. and Crona T., "Sensor data fusion of optical and active radar data," Proc. SPIE 5429, 490-500 (2004)
[14] Mobus R. and Kolbe U., "Multi-Target Multi-Object Tracking, Sensor Fusion of Radar and Infrared," IEEE Intelligent Vehicles Symposium (2004)
[15] Amditis A., Polychronopoulos A., Floudas N., Andreone L., "Fusion of infrared vision and radar for estimating the lateral dynamics of obstacles," Information Fusion 6(2), 129-141 (2005)
[16] Everett M., Manson D., Brook A., Davidson G., "A Naval Infrared Search and Track Demonstrator and its fusion with other ship sensors," Proc. SPIE 6206, 620626 (2006)
[17] Gang W., Kun-tao Y., "Discussion on Operating Range of Shipborne Infrared Search-and-Track System," Proc. SPIE 6150, 61501V (2006)
[18] L Bombini, P Cerri, P Medici, G Alessandretti in Symposium, "Radar-vision fusion for vehicle detection", A Quarterly Journal In Modern Foreign Literatures ( ) 2006
[19] Latger J., Cathala T., Douchin N., Le Goff A., "Simulation of active and passive infrared images using the SE-Workbench," Proc. SPIE 6543, 654302 (2007)
[20] Forand J. L., "Method to estimate infrared and radio-frequency synergy," Optical Engineering 46(12), 126001 (2007)
[21] Y. Tan, F. Han, and F. Ibrahim, "A radar guided vision system for vehicle validation and vehicle motion characterization," in Proc. IEEE Intell. Vehicles Symp., 1059-1066 (2007)
[22] Feng H., Wan Hai Y., "Radar and Infrared Data Fusion Algorithm Based on Fuzzy-neural Network," Proc. SPIE 6723, 67233S (2007)
[23] de Villers Y., "A fusion study of a range-Doppler imager with an infrared sensor for ground-to-ground surveillance," Proc. SPIE 7308, 73081B (2009)
[24] Wu, S. Decker, S. Chang, P., Camus, T., Eledath J., "Collision Sensing by Stereo Vision and Radar Sensor Fusion," IEEE Trans. on Intelligent Transportation Systems 10(4), 606-614 (2009)

BACKGROUND

Applications which use a fusion of optics and radar include driver assistance, navigation aids, collision avoidance and obstacle avoidance. Yet another important application is land surveillance. At sea, the fusion of optical sensors with radar is used to resolve mirage and signal ambiguity problems above the horizon, and to allow for fine accuracy target tracking. Air-to-Air target detection and tracking using airborne IRST and Fire-Control-Radar (FCR) is also known. The brightness of target signal data was also used to resolve the location of adjacent targets along with the radar data.

FIG. 1 is a table which compares various characteristics of existing optical detection units and corresponding characteristics of existing radar detection units.

SUMMARY

Many of the functional components of the presently disclosed subject matter can be implemented in various forms, for example, as hardware circuits comprising custom VLSI circuits or gate arrays, or the like, as programmable hardware devices such as FPGAs or the like, or as a software program code stored on an intangible computer readable medium and executable by various processors, and any combination thereof. A specific component of the presently disclosed subject matter can be formed by one particular segment of software code, or by a plurality of segments, which can be joined together and collectively act or behave according to the presently disclosed limitations attributed to the respective component. For example, the component can be distributed over several code segments such as objects, procedures, and functions, and can originate from several programs or program files which operate in conjunction to provide the presently disclosed component.

In a similar manner, a presently disclosed component(s) can be embodied in operational data or operational data can be used by a presently disclosed component(s). By way of example, such operational data can be stored on tangible computer readable medium. The operational data can be a single data set, or it can be an aggregation of data stored at different locations, on different network nodes or on different storage devices.

The method or apparatus according to the subject matter of the present application can have features of different aspects described above or below, or their equivalents, in any combination thereof, which can also be combined with any feature or features of the method or apparatus described in the Detailed Description presented below, or their equivalents.

According to an aspect of the presently disclosed subject matter, there is provided a system for estimating a source location of a projectile. According to examples of the presently disclosed subject matter, a system for estimation a source location of a projectile can include a optics subsystem, a radar subsystem and a processor. The processor can adapted to use range and velocity measurements from the radar subsystem, a source direction and an event start time from the optical subsystem and a predefined kinematic model for the projectile to estimate a range to a source location of the projectile.

According to a further aspect of the presently disclosed subject matter, there is provided a method of estimating a source location of a projectile. According to examples of the presently disclosed subject matter, the method of estimating a source location of a projectile can include: using a range and velocity measurements from a radar subsystem, a source direction and an event start time from an optical subsystem and a predefined kinematic model for the projectile for estimating a range to a source location of the projectile.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 1 is a table which compares various characteristics of existing optical detection units and corresponding characteristics of existing radar detection units;

FIG. 4 is a graphical representation of the example-case projectile kinematic model (speed and range vs. time—assuming the projectile is flying directly at the system), according to examples of the presently disclosed subject matter;

Figure 2:
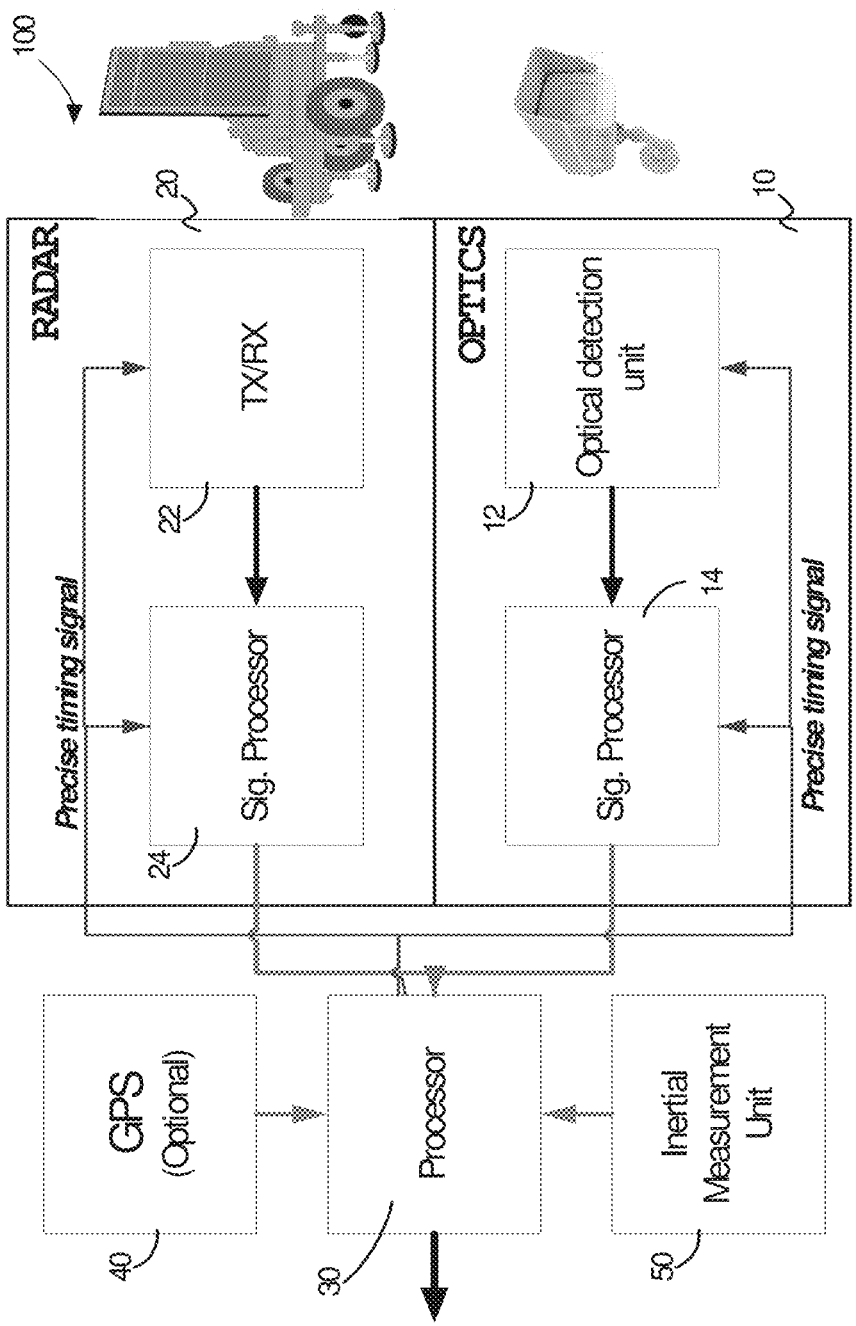
FIG. 2 is a block diagram illustration of an implementation of a system for estimating a source location of a projectile, according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION

In the following description, numerous specific details are set forth in order to provide a thorough understanding of the disclosed subject matter. However, it will be understood by those skilled in the art that the disclosed subject matter can be practiced without these specific details. In other instances, well-known methods, procedures and components have not been described in detail so as not to obscure the presently disclosed subject matter.

Unless specifically stated otherwise, as apparent from the following discussions, it is appreciated that various functional terms can refer to the action and/or processes of a computer or computing device, or similar electronic device, that manipulate and/or transform data represented as physical, such as electronic quantities within the computing device's registers and/or memories into other data similarly represented as physical quantities within the computing device's memories, registers or other such tangible information storage, transmission or display devices.

The term "projectile" is known in the art, and the following definition is provided as a non-limiting example only for convenience purposes. Accordingly, the interpretation of the term projectile in the claims, unless stated otherwise, is not limited to the definition below, and the term "projectile" in the claims should be given its broadest reasonable interpretation. Throughout the description and in the claims, reference is made to the term "projectile". The term "projectile" as used here relates to an object that is launched projected, ejected, fired, etc., and where the launch, projection, ejection or firing of the projectile has an optical signature which is detectable by an optical detection unit or subsystem. For example, the optical signature can be associated with a muzzle flash or an ignition of a propellant, which is approximately coincident with the time of the launch projection, ejection, firing of the projectile. For convenience, the term launch is used herein to describe any event that is associated with the launch, projection, ejection or firing of the projectile and which is substantially coincident with the optical signature that is detected by the optical subsystem, as further described herein.

It would be appreciated that the projectile can be powered or not, and that the projectile can be guided or unguided.

Throughout the description and in the claims, reference is made to the terms "source location". The terms "source location" as used here relates to the location of the optical signature that is associated with the launch, projection, ejection or firing of the projectile which was detected by the optical subsystem.

According to examples of the presently disclosed subject matter, the projectile can be approximately or accurately headed towards a predefined point of interest. For example, the projectile can be approximately or accurately headed towards the system which is used to estimate a source location of a projectile. Still further by way of example, the projectile can be approximately or accurately headed towards a radar subsystem which is used by the system.

According to an aspect of the presently disclosed subject matter, there is provided a system for estimating a source location of a projectile. It would be appreciated that the system, which is described below in further details can be a stationary or mobile. For example, the system can be mounted on a vehicle traveling on land (e.g., a car, a truck, etc.), at sea (e.g., a ship), in the air (e.g., a helicopter, an aircraft, etc.) or in space.

According to examples of the presently disclosed subject matter, the system can include an optics subsystem, a radar subsystem and a processor. The optics subsystem can be configured to detect a launch of the projectile within predefined range limits from the system. Based on data related to the launch from the optical subsystem, the processor can be configured to obtain an event start time and a source direction. The processor can be configured to provide the radar subsystem with initialization settings that are based on the source direction and the event start time.

The radar subsystem can be configured to operate according to the initialization settings to obtain range and velocity measurements for the projectile at a given instant. The processor can be configured to use the range and velocity measurements from the radar subsystem, the source direction and the event start time from the optical subsystem and a predefined kinematic model for the projectile for estimating a range to the source location.

According to examples of the presently disclosed subject matter, the processor can be configured to determine the source location based on the estimated range to the source location and based on the source direction. In still further examples of the presently disclosed subject matter, the processor is configured to determine the source location further based on a self location of the system. By way of example, the system can include a GPS ("Global Positioning Service") receiver module and/or an INS ("Inertial Navigation System") module which is configured to provide the self location of the system.

According to examples of the presently disclosed subject matter, in case the system is mobile and is moving during the flight of the projectile, the processor can be configured to take into account the movement of the system when determining the range to the source location and when estimating the source location.

According to examples of the presently disclosed subject matter, the kinematic model can be a relatively naïve approximation which assumes that the projectile's velocity that was measured by the radar at the given instant was constant and was maintained by the projectile from the launch.

According to further examples of the presently disclosed subject matter, based on the projectile's velocity that was measured by the radar at the given instant, the processor can be configured to perform a mathematical backward extrapolation of the projectile's velocity down to the event start time.

According to still further examples of the presently disclosed subject matter, the processor can be configured to further take into account predefined or conditions dependent operational parameters of the system or of any of its components and/or predefined or conditions dependent environmental parameters when determining the range to the source. For example, the processor can be configured to take into account a predefined or conditions dependent random noise level and/or predefined or conditions dependent bias errors.

In still further examples of the presently disclosed subject matter, the processor can be configured to take into account further predefined or conditions dependent operational parameters of the system or of any of its components and/or predefined or conditions dependent environmental parameters, including for example: an optical geometrical distortion of the optical subsystem optics, a line of sight misalignment between the radar subsystem and the optics subsystem, an optical subsystem response spatial (angular) non-uniformity, report latency and delays, an optical spot Centroid estimation, etc.

In yet further examples of the presently disclosed subject matter, the processor can be configured to further take into account predefined operational parameters of the system or of any of its components and/or environmental parameters (e.g. air temperature wind velocity and direction and air pressure) in order to calculate a certainty range and direction boundaries for the source location. In yet further examples of the presently disclosed subject matter, the system can include one or more of the following: a wind-velocity sensor, an air temperature sensor and a (air) pressure sensor. Still further by way of example, one or more of the wind-velocity sensor, the air temperature sensor and the (air) pressure sensor can sense certain environmental conditions related to the operation of the system, and environmental parameters which are associated with the environmental conditions that were sensed by the sensors can be taken into account by the processor at least when processing measurements from the optics subsystem or from the radar subsystem.

In still further examples of the presently disclosed subject matter, the radar subsystem can be configured to obtain a plurality of range and velocity measurements for the projectile at a plurality (two or more) of different instants during the flight of the projectile, and the processor can be configured to use the plurality of range and velocity measurements for estimating the range to the source location. In addition to the plurality of range and velocity measurements, the processor can be configured to use the source direction, the event start time and a predefined kinematic model for the projectile and possibly also predefined or conditions dependent operational parameters of the system or of any of its components and/or predefined or conditions dependent environmental parameters for estimating the range to the source location. According to examples of the presently disclosed subject matter, in case the system has no a-priori knowledge of the type of projectile, the processor can be configured to assume, in parallel, multiple kinematic models, calculate their back projection extrapolation, and then choose the one(s) that best match the measured data.

According to examples of the presently disclosed subject matter, the predefined kinematic model for the projectile can consist of multiple (two or more) phases. According to examples of the presently disclosed subject matter, two or more different phases of the kinematic model for the projectile can be associated with a different velocity of the projectile. Further by way of example, the different velocity of the projectile can be based on an assumption of a certain acceleration/deceleration of the projectile during different periods of its flight.

According to still further examples of the presently disclosed subject matter, the processor is configured to implement a minimum velocity threshold, and in case the measured velocity of the projectile is determined to be less than the minimum closing-in velocity threshold the projectile is considered be non-threatening. Further by way of example, in case the projectile is considered to be non-threatening, the system terminates all operations relating to the projectile.

According to still further examples of the presently disclosed subject matter, the processor is configured to assume a bias error and/or a random velocity error in respect to the radar's measurements.

According to yet another aspect of the presently disclosed subject matter there is provided a method of estimating a source location of a projectile. According to examples of the presently disclosed subject matter, the method of estimating a source location of a projectile can include: detecting using an optical subsystem a launch of the projectile within predefined range limits from the system; obtaining an event start time and a source direction based on data related to the launch from the optical subsystem; providing a radar subsystem with track-initialization settings which are based on the source direction and the event start time; obtaining using the radar subsystem range and velocity measurements for the projectile at a given instant; and estimating a range to the source location based on the range and velocity measurements from the radar subsystem, the source direction and the event start time from the optical subsystem and based on a predefined kinematic model for the projectile, or a library of possible kinematic models.

Further examples of the presently disclosed subject matter are implementations of the herein disclosed operations carried out by the components of the system which combines optical sensing and radar sensing to estimate a source location of a projectile, but are not necessarily carried out by the respective components of the herein disclosed system. Rather in some examples of the presently disclosed subject matter, the method can be implemented using any suitable hardware, computer implemented software and any suitable combination of hardware and computer implemented software.

Further examples of the presently disclosed subject matter are now described.

Reference is now made to FIG. 2, which is a block diagram illustration of an implementation of a system for estimating a source location of a projectile, according to examples of the presently disclosed subject matter. According to examples of the presently disclosed subject matter, the system 100 can include an optics subsystem 10, a radar subsystem 20 and a processor 30.

According to examples of the presently disclosed subject matter, the optics subsystem 10 can be configured to detect a launch of the projectile within predefined range limits from the system 100 or from the optics subsystem 10. Projectile launch detection using optics is known per-se and any suitable optics subsystem and method can be used for detecting the launch of the projectile. For illustration purposes there are now provided non-limiting examples of optics that can be used for detecting the launch of the projectile:

According to an example of the presently disclosed subject matter, the optics subsystem can include a detection module that utilizes potassium (K) doublet emission lines (e.g. ~760 nm) or Sodium (N) emission lines detection with contrast to adjacent optical spectrum narrow bands which lack this emission from flash, plume and fire radiance.

According to a further example of the presently disclosed subject matter, the optics subsystem can include a detection module that utilizes the contrast between "Red-band" (within MWIR 4.4 um-4.9 um spectral band) and other MWIR sub-bands as evident in flash, plume and fire radiance.

According to yet a further example of the presently disclosed subject matter, the optics subsystem can include a detection module that utilizes solar blind UV (SBUV) emission from flash, plume and/or fire radiance—with contrast to natural and/or artificial scene background which lack significant radiance in the SBUV band.

According to still a further example of the presently disclosed subject matter, the optics subsystem can include a detection module that utilizes LWIR spectral band radiance emitted from flash, plume and fire radiance.

According to a further example of the presently disclosed subject matter, the optics subsystem can include a detection module that utilizes significant blackbody and/or molecular (e.g. $H_2O$) emission in the SWIR (1.0 um-2.5 um) optical spectral band with contrast to other optical sub-bands (e.g. visible [0.4 um-0.7 um], NIR [0.7 um-1.0 um]) in which same emission is essentially lower, using one or more sensors dedicated to different spectral sub-bands.

Those versed in the art have the knowledge that is necessary to provide an optics subsystem which includes the appropriate sensors for detecting a projectile lunch according to the examples provided herein.

Based on data related to the launch from the optics subsystem 10, the processor 30 can be configured to obtain an event start time and a source direction. The processor 30 can be configured to provide the radar subsystem 20 with initialization settings that are based on the source direction and the event start time. The radar subsystem 20 can be configured to operate according to the initialization settings to obtain range and velocity measurements for the projectile at a given instant. The processor 30 can be configured to use the range and velocity measurements from the radar subsystem 20, the source direction and the event start time from the optical subsystem and a predefined kinematic model for the projectile for estimating a range to the source location.

It would be appreciated that in a temporally and spatially aligned system, e.g., where the optics subsystem 10 and the radar subsystem 20 measurement reports are temporally and spatially aligned, estimating of the range to the source location based on the event start time and the source direction (which are obtained based on data related to the launch from the optics subsystem 10), and based on the range and velocity measurements (which are obtained based on data from the radar subsystem 20), and further based on the predefined kinematic model for the projectile, can be carried out using techniques and equipment which are known per-se to those versed in the art.

It would be appreciated that according to examples of the presently disclosed subject matter, the optics subsystem 10 and the radar subsystem 20 can have an accurate common (and/or otherwise synchronized) timing, It would be also appreciated that according to examples of the presently disclosed subject matter, the optics subsystem 10 and the radar subsystem 20 can be aligned so as to allow co-registration of the directions of the optics subsystem LOS and the radar subsystem LOS and towards a detected event (e.g. azimuth and elevation).

Examples of techniques which can be implemented to achieve accurate common timing, and examples of techniques which can be implemented to allow co-registration of the directions of the optics subsystem and the radar subsystem LOS and towards a detected event are now disclosed, as part of examples of the presently disclosed subject matter.

As mentioned above, according to examples of the presently disclosed subject matter, the co-operation among the optics subsystem 10 and the radar subsystem 20 requires precise alignment and registration of the directions towards a detected event (azimuth and elevation) as reported by the two subsystems.

According to examples of the presently disclosed subject matter, the co-registration is made to be substantially accurate at every field direction within the common field of view of the detection subsystems (e.g., the optics subsystem and the radar subsystem). Further by way of example, a misalignment angular error (pitch, roll, and yaw) between different detection subsystems (e.g., the optics subsystem and the radar subsystem) can be precisely registered and then—direction finding reports (Azimuth, Elevation) within the FOV of each of the detection subsystems (e.g., the optics subsystem and the radar subsystem) can be precisely measured and registered.

According to examples of the presently disclosed subject matter, co-registration of the optics subsystem and the radar subsystem directions (and possibly additional detection subsystems if exist) can involve mechanically aligning the LOS (or a similar indicator of the direction of the FOV) of the optics subsystem and the radar subsystem and possibly additional detection subsystems if they exist).

According to examples of the presently disclosed subject matter, the co-registration of the optics subsystem and the radar subsystem (and possibly additional detection subsystems if they exist) can further include providing as similar as possible FOVs for the optics subsystem and the radar subsystem (and possibly additional detection subsystems if exist), such that the FOV that is common to the optics subsystem and to the radar subsystem (and possibly to additional detection subsystems, if they exist) is substantially maximized with respect to the detection subsystems overall FOV solid angle. In this regard, it should be appreciated that the field of regards or FORs (i.e.—the scene sector, in Earth coordinates, regarded by the sub-system's FOV, considering the direction of its center (LOS)) of the detection subsystems should have a common part as dictated by the system level requirement. In order to avoid increasing the individual detection subsystem FOVs (as a possible means to compensate for mismatch between LOS directions)—which could complicate the detection subsystem design and/or decrease its performance (e.g. detection range, FAR etc.), the Line Of Sights (LOSs) of the detection subsystems should be aligned as much as possible taking into account the operational and other practical circumstances.

A further co-registration operation which can be implemented according to examples of the presently disclosed subject matter, can include utilizing high accuracy measurement of the angular FOV deviations between the detection subsystems (e.g., the optics subsystem and the radar subsystem), and the geometrical mapping between directions reported by the detection subsystems and the true direction towards a detected event by same detection subsystems. These measurements can be used to compensate for any direction finding (DF) errors using calculations which are known per se. It would be appreciated that the latter co-registration calibration operation can be effective within a FOV which is common to the detection subsystems, and on-condition that the components (mechanics, electronics and optics) of the detection subsystems are stable enough to a certain degree (which reflects the required co-registration accuracy), until the next co-registration calibration measurement is carried out.

It would be appreciated that according to examples of the presently disclosed subject matter, as part of the co-registration of the detection subsystems referencing of their source location report to an external, global direction (e.g. azimuth w.r.t magnetic north, geographic north etc., elevation w.r.t true horizon, nadir etc.) can be carried out. The below examples, describe calibration techniques and methods which can be implemented as part of examples of the presently disclosed subject matter. It would be appreciated that if the location of the calibration objects is known wrt to a global reference, then the calibration techniques described herein can readily be used for global referencing. Descriptions of examples of techniques and methods for measuring a single field angle are followed by descriptions of examples of techniques and methods for measuring of multiple field angles.

According to examples of the presently disclosed subject matter, a radar calibration objection object (e.g., a radar reflector) can be positioned at a range large enough to be considered as far-field for the radar subsystem, and the radar calibration object is co-positioned with an optical calibration object (e.g., a light emitter) which is configured to provide (e.g., emit, reflect, etc.) an optical signal at spectral band(s) in which the optics subsystem is substantially sensitive to incoming optical signals. By way of example, in order to maximize the contrast and SNR of measurement of the direction towards the optical calibration object, a light emitter can be provided which has an amplitude and/or a phase and/or a frequency that is modulated such that most of the generated optical signal is given off in a narrow frequency, phase bandwidth, and/or during short periods of time (narrow pulses), in order to allow for complete measurement of the angular deviation.

A further example of a technique that can be used for calibration (or local direction referencing) is similar to the calibration technique which was described in the preceding paragraph, with the following modification: the positioned calibration objects (e.g., radar reflector and light emitter) can be placed at known locations (e.g., the locations can be measured with measurement units other than the detection subsystems which are being calibrated), and the detection subsystems being calibrated (e.g., the optics subsystem and the radar subsystem) can also be located at a well known geographic position. In this manner—the viewing directions from the detection subsystem towards a detected object(s) can be calculated off-line (or on-line) and used to correct for the DF reports of each one of the detection subsystem, and to compensate for any error(s).

A further example of a technique that can be used for calibration is similar to the calibration technique which was described in each of the two preceding paragraphs, and further including implementing an image processing algorithm to reduce the errors induced by atmospheric path (between the detection subsystems that are being calibrated and a target(s)) turbulence, and/or for optical abberations in the optics of the optics subsystem.

Yet a further example of a technique that can be used for calibration is similar to the calibration technique which was described above, but in this example, the optical calibration object is not artificially introduced in the FOV but rather it is some object which is part of the scenery. For example, the optical calibration object can be detected automatically using an image processing algorithm, for example processing algorithms which implement feature extraction in the digital imagery signals or similar techniques, and which can be used for example to detect building edges, polls, antenna towers etc., based on predefined criteria. Still further by way of example, once the optical calibration object is detected and selected for use, a direction towards a feature of the object (e.g. edge, center, maximum brightness location) can be measured. The feature can also be selected automatically based on predefined logic and/or algorithms Yet further by way of example, the radar calibration object can be installed in a vicinity of the optical calibration object. Still further by way of example, if one of the radar subsystem or the optics subsystem already calibrated (was calibrated in a different time or setting), then only the other (yet to be calibrated) subsystem should be calibrated.

In yet a further example, that can be used for calibration and is similar to the calibration technique which was described above, but as an optical calibration object, an object, onto which a grid of light or structured light (e.g., a 2D spatial pattern of light) is projected, is used. The structured light projection can be configured to enable reflection of light toward the optics subsystem in the optical sensitivity spectrum of the optics subsystem. The Radar calibration object can be positioned with relation to the object onto which the structured light is projected, e.g., in the same location or in a location that is substantially adjacent to the optical calibration object.

According to some examples of the presently disclosed subject matter, the optics subsystem can include a projector that is configured to project the structured light, and thus in such an example, the structured light can be created by the optics detection subsystem itself (e.g.—by projecting light onto the imaged scenery). In yet a further example, the source of the structured light is external to the optics subsystem.

As mentioned above, in addition to the co-registration of the optics subsystem and the radar subsystem, accurate common timing of measurements may also be required as part of some examples of the presently disclosed subject matter. Examples of techniques and methods which can be implemented as part of examples of the presently disclosed subject matter to achieve accurate common timing are now described.

According to examples of the presently disclosed subject matter, a common timing reference for the optics subsystem and the radar subsystem can be obtained by:

(a) a GPS timing signal as received and analyzed by a GPS receiver which can be implemented as part of either one of the optics subsystem or the radar subsystem or externally to these subsystems, within the system.

(b) a clock signal which can be generated by either one of the optics subsystem or the radar subsystem and can be transmitted to the other subsystem as a reference. Counters in either one of the optics subsystem or the radar subsystem or in both subsystems can be used to count a number of clock signal pulses in order to establish cumulative time counting.

In a further example, a common (external) timing reference for both the optics subsystem and the radar subsystem can be avoided by allowing one of the optics subsystem or the radar subsystem to act as a "master" with respect to the other subsystem (which will act as a "slave"). In this configuration the slave subsystem can be configured to respond to messages sent by the master, as demonstrated in two different implementations below:

(a) a time code message can be generated by either one of the optics subsystem or the radar subsystem which acts as a master. The time code is communicated to the slave subsystem, which is responsive to receiving the time code for responding the master subsystem with a message that contains information about the slave subsystems measurements (e.g. velocity, range, azimuth, elevation, launch event etc.) and a respective time code which indicates the time difference between the time of receipt of the time code message and the time of the measurements in respect of which data is included in the response message.

(b) in this implementation, either one of the optics subsystem or both can operate a timer. One of the optics subsystem or the radar subsystem, which for convenience will be referred to now as the first subsystem, can be configured to accumulate the counts of its own timer, while whenever the first subsystem performs a measurement it can be configured to send a reset command to the second subsystem's timer. In this way, when the second subsystem reports its measurement results (e.g., to the first subsystem), the counting status of the second subsystem's local timer that is attached to the report indicates the lag between the measurement time of the first subsystem and that of the second subsystem. It would be appreciated that this technique can nullify any drifts that could have otherwise accumulated over time between the two clocks (or timers) running separately without coordination in the first and the second subsystems (even if these clocks had, in theory, the same counting rate (e.g. frequency)).

It would be appreciated that accurate knowledge of the instance of time, relative to a common (local) time reference, in which the optics subsystem and the radar subsystem make their respective measurements can be implemented in the system to decrease projectile's origin (launcher, barrel, etc.) location estimation errors. For instance, if the projectile measurement at the time it is detected by the radar subsystem is V [m/s] and the relative timing error between the optics subsystem and the radar subsystem is dt [sec], then the resulting launcher location error may be as large as V×dt [m]. Since high-energy kinetic projectile velocity can reach 1740 m/s (e.g. General Dynamics KEW-A1, see http://en.wikipedia.org/wiki/Kinetic_energy_penetrator) 20 m accuracy may require timing accuracy of better than 10 ms which suggests yet better accuracy at each and every part of the timing mechanisms described above—as the accumulated error must stay less than 10 ms.

Having described the spatial and temporal alignment of the optics subsystem 10 and the radar subsystem 20, there are now provided further details according to examples of the presently disclosed subject matter, with respect to the implementation of the various components of the system 100.

According to examples of the presently disclosed subject matter, the optics subsystem 10 can include an optical detection unit 12 and a signal processor 14. It would be appreciated that this is a simplified illustration of an optics subsystem 10, and that various optics subsystems in different configurations can be used as part of the system for estimating a source location of a projectile 100 according to examples of the presently disclosed subject matter. By way of example, the optics subsystem 10 can include one or more optical detection channels, each of which can be imaging or non imaging, each of which can include optical spectral filters, an optical lens or lenses, an optical detector, detector analog and digital readout electronics, nd-filters and mechanics to mount, support and stabilize the optics and other components of the optics subsystem. Each channel can also include a cooling unit and/or a temperature stabilization module for the detector and for any other component of the channel.

According to examples of the presently disclosed subject matter, the signal processor 14 of the optics subsystem 10 can be configured to perform an initial processing of the signals generated by the optical detection unit 12 and can provide the detection data mentioned herein to the processor 30 for further processing.

According to examples of the presently disclosed subject matter, the radar subsystem 20 can include a transmitter receiver unit transceiver 22 and a signal processor 24. It would be appreciated that this is a simplified illustration of a radar subsystem 20, and that various radar subsystems in different configurations can be used as part of the system for estimating a source location of a projectile according to examples of the presently disclosed subject matter. By way of example, the radar subsystem 20 can include an antenna (or an array of antennae) or an array of antennae or a phase array antennae, a low noise amplifier, a modulator, a demodulator, switches and diplexer. It would be appreciated that in some examples of the presently disclosed subject matter, any reference made herein to components of the system can also refer to multiple units of each component, as appropriate.

According to examples of the presently disclosed subject matter, the signal processor 24 of the radar subsystem 20 can be configured to perform an initial processing of the signals generated by the transmitter receiver unit 22 and can provide data related to the measurements preformed by the radar subsystem 20 to the processor 30 for further processing.

According to examples of the presently disclosed subject matter, the system 100 can further include a GPS receiver module 40 and/or an INS module 50. The GPS 40 or INS 50 can provide the self location of the system 100, and the processor can use the self location data to determine the location of the source location of the projectile.

In still further examples of the presently disclosed subject matter, the system 100 can further include a cover case (not shown). For example, the cover case can house at least the optics subsystem 10 and the radar subsystem 20. Still further by way of example, the cover case can be adapted to protect the optics subsystem 10 and the radar subsystem 20 against external environmental conditions (e.g. rain, hail, dust, wind etc.). Still further by way of example, the cover case can include an aperture or apertures which are transparent to radar EM signals (RADOME) and transparent to optical wavelengths. Thus for example, the cover case can enable common installation of the optics subsystem 10 and the radar subsystem 20 behind a common mechanical aperture. An example of an aperture that can be used in the cover case is described in US Patent Publication 2012/0038539, which discloses an integrated radio frequency (RF)/optical window that includes an RF radome portion provided from a composite material substantially transparent to RF energy disposed about an optical window configured for use with an optical phased array, and which is hereby incorporated by reference in its entirety.

Further in connection with the cover case, and according to examples of the presently disclosed subject matter, it would be appreciated that the optics subsystem 10 includes optical elements (e.g. in lenses), optical filters, attenuators, windows and other types of optical quality surfaces, and can be sensitive to humidity in general and to condensation in particular, which can compromise the surface quality of the optical elements surfaces. According to examples of the presently disclosed subject matter, in order to avoid or reduce the effects of such condensation, the cover case can provide a controlled atmosphere (dry and clean) therewithin at least where the optics subsystem 10 is installed. For example, the cover case can include a chamber for housing the optics subsystem 10, and the environmental conditions within the chamber can be controlled. It would be appreciated that the controlled atmosphere chamber can contribute towards size and weight reduction of the system 100.

Further, as would be appreciated by those versed in the art, operation of the active part of the radar antenna and associated electronics can generate RFI and EMI at the optics subsystem's 10 electronics. Thus, according to examples of the presently disclosed subject matter, the chamber in which the optics subsystem 10 is installed within the cover case, can be well isolated from the interferences created by the operation of the radar subsystem 20, in order to mitigate such interferences (e.g. Faraday cage can be used). Still further by way of example, the electrical leads (power supplies, signal wires etc.) of the optics subsystem 10 can be isolated from the conducted and emitted interference as generated by the radar subsystem 20.

There is now provided a description of certain predefined models which can be implemented by the processor 30 to determine the source location of the projectile. It would be appreciated that according to examples of the presently disclosed subject matter, other models can be implemented by the processor 30 to determine the source location of the projectile. In further examples of the presently disclosed subject matter, certain details of the models set forth below can be adjusted or modified or omitted from the model that is implemented by the processor and/or the models set forth below can be expanded with additional computations.

According to examples of the presently disclosed subject matter, the processor 30 can be configured to implement a predefined kinematic model of the projectile. According to examples of the presently disclosed subject matter, the predefined kinematic model of the projectile assumes that the launch of the projectile occurs at t=0. An expression for the muzzle velocity can be included in the kinematic model, for example the expression $$v_{nom1} \pm \delta v_1 \left[\frac{m}{s}\right]$$

can be included in the kinematic model, where $v_{nom1}$ is the nominal velocity and $\delta v_1$ is an associated uncertainty.

According to examples of the presently disclosed subject matter, the kinematic module can assume that at an instant which can be denoted by $t=T_1$ the projectile starts accelerating (or de-accelerating) at a linear rate with time. The kinematic model can further assume that at $t=T_2$ this acceleration (or de-acceleration) ends, and at which point the projectile is at a velocity that can be denoted by $$v_{nom2} \pm \delta v_2 \left[\frac{m}{s}\right],$$

where $v_{nom2}$ is a nominal velocity and $\delta v_2$ is an associated uncertainty.

Following $t=T_2$ and until $t=T_3$ the kinematic model can assume a generic deceleration rule based on aerodynamic drag (and assuming the projectile balances gravity with lift and hence does not change its altitude) as can be denoted by the expression $F_d = \frac{1}{2} \rho \cdot v^2 C_d \cdot S$, where $\rho$ is the air density [kg/m³], v is the projectile velocity [m/s], $C_d$ is the drag coefficient and s is the projectile cross section area [m²]. Assuming a constant air density $\rho$, a nonlinear declaration rule can be derived:

$$\alpha = \frac{dv}{dt} = K \cdot v^2 \rightarrow \int \frac{dv}{v^2} = \int K \cdot dt \rightarrow v(t) = \frac{1}{K \cdot t + C}$$

-continued $$v(0) = v_2,$$

$$v(t_3 - t_2) = v_3,$$

$$C = \frac{1}{v_2} \to K = \frac{1}{v_2 \cdot v_3} \frac{(v_2 - v_3)}{(t_3 - t_2)} \left[\frac{1}{m}\right]$$

where $v_3$ can denote the projectile velocity at time $t=T_3$. Since $v_3$ is a random variable, it can be calculated using the expression:

$$v_3 = v_{nom3} \pm \delta v_3 \left[\frac{m}{s}\right].$$

The complete nominal (no errors) velocity profile of the projectile can be denoted as $v_0(t)$ and the nominal range between the projectile and the source location (the location of the launcher (gun), immediately following the launch can be denoted by $R_0(t)=\int_0^t v_0(\tau)d\tau$.

The kinematic model can be completed by assigning a minimum and maximum launcher to target (the location of the system) range limits which can be denoted by $R_{launch\_min}$ and $R_{launch\_max}$ respectively.

According to examples of the presently disclosed subject matter, the processor 30 can further implement a model that is related to the radar subsystem 20. According to examples of the presently disclosed subject matter, in accordance with the model which relates to the radar subsystem 20 it can be assumed that:

The range to projectile is smaller a maximum range which can be denoted by $R_{max}$, where $R_{max}$ can vary between a best maximum range which can be denoted by $R_{max\_best}$ which indicates the longest possible detection range under the most favorable conditions, and a worst maximum range which can be denoted by $R_{max\_worst}$ which indicates the shortest (guaranteed) detection range under the worst case operation conditions.

In order to be considered a valid threat, the projectile's velocity should be greater than a projectile velocity threshold which can be denoted by $v_{min}$ [m/s].

The radar output data can consist of: the range at time t, with associated random error $\sigma_R$ [% RMS] as percentage of the true range, and a bias error $\mu_R$ [%] (which for convenience is assumed to be zero in the following examples); and the velocity at time t, with associated random error which can be denoted by $\sigma_v$ [% RMS] as percentage of the true velocity, and a bias error which can be denoted by $\mu_v$ [%] (which for convenience is assumed to be zero in the following examples).

According to examples of the presently disclosed subject matter, the processor 30 can further implement a model that is related to the optics subsystem 10. According to examples of the presently disclosed subject matter, in accordance with the model which relates to the optics subsystem 10 it can be assumed that:

The optics subsystem 10 detects the launch event substantially immediately after it starts. For example, the models for the optics subsystem 10 can assume that the optics subsystem 10 detects the launch event with a possible delay of no more than its video frame time; the optics subsystem's 10 measurements timing is substantially precisely synchronized with the radar subsystem's 20 measurements; the optics subsystem 10 update rate is fast enough to allow for characterizing the detected event and associating it with a launch/ejection/projection/fire event optical signal as opposed to other possible optical sources, as well as fast enough to mitigate the effects brought about by moving (linear and/or angular) of the system and/or of objects in the field of regard of the system. For example—an optical sensor operating in the SWIR band should typically operate at a rate higher than approximately 200 Hz.

In order to demonstrate the capacity of the system according to examples of the presently disclosed subject matter to estimate the location of the projectile launcher, the scenario parameters of Table 1 below are assumed. It would be appreciated that the scenario presented herein below is a mere example of one possible scenario wherein one possible implementation of the system for estimating a source location of a projectile is utilized to estimate the projectile source.

In the below scenario three different algorithms are proposed for calculating the source location based on the measurements carried out in the system according to examples of the presently disclosed subject matter. It would be appreciated that any one of these algorithms can be implemented by the system.

TABLE 1

| Case study parameters | |
|---|---|
| RADAR | |
| 50 [m/s] | $V_{min}$ |
| 1500 [m] | $R_{max}$(worst) |
| 2000 [m] | $R_{max}$(best) |
| 10% | $\sigma_v$ |
| 10% | $\sigma_R$ |
| Projectile | |
| 0.15, 1.5, 15 [sec] | $T_1, T_2, T_3$ |
| 20, 300, 160 [m/s] | $V_1, V_2, V_3$ |
| 3000 [m] | $R_{launch}$(max) |
| 1000 [m] | $R_{launch}$(min) |
| 1, 10, 10 [m/s] | $dV_1, dV_2, dV_3$ |

Assume the projectile is launched at a range denoted by $R_{launch}$ ($R_{launch}$ is within the range limits as set above). The optical subsystem detects the launch event at $t_0=0$. The radar subsystem measures velocity of the projective and range to the projectile at $t=T_{radar}$ based on the parameters in table-1. A first estimate of the projectile range and velocity is set according to: $R_{radar}=R_m(T_{radar})+\Delta R$ $v_{radar}=v_m(T_{radar})+\Delta v$, where $R_m(T_{radar})$ denotes a true range to the projectile at time $t=T_{radar}$, $\Delta R$ denotes a radar range measurement error, $v_m(T_{radar})$ denotes a projectile true velocity at $t=T_{radar}$ and $\Delta v$ denotes a radar velocity measurement error.

Three different estimation algorithms are proposed and each of which can be implemented by the system:

Algorithm 1: Estimate a range from the projectile to the launcher based on a model of projectile range versus time after launch. For example, the following expression can be used to denote this computation: $\hat{R}_{m1}=R_0(t=T_{radar})$, $\hat{R}_{launch1}=R_{radar}+\hat{R}_{m1}$, where $\hat{R}_{m1}$ denotes a pre-stored model of the projectile nominal kinematics which assigns a single projectile trajectory path denoted by $R_0$ for a velocity denoted by $v_m(T_{radar})$.

Algorithm 2: Estimate a projectile-launcher range based on a model of projectile velocity versus time after launch. For example, the following expression can be used to denote this computation: $\hat{R}_{m2}=R_0(t|v_0(t))=V_{radar})$, $\hat{R}_{launch2}=R_{radar}+\hat{R}_{m2}$.

Algorithm 3: Calculate $\hat{R}_{m1}$ and $\hat{R}_{m2}$ using the above computations, and minimize the inconsistencies between the two using variations calculus. For example, the following expression can be used to denote this computation: $\in_v = v_0 (T_{Radar}) - V_{radar}$, $\in_R = \hat{R}_{launch1} - \hat{R}_{launch2} = \hat{R}_{m1} - \hat{R}_{m2}$.

Figure 3:
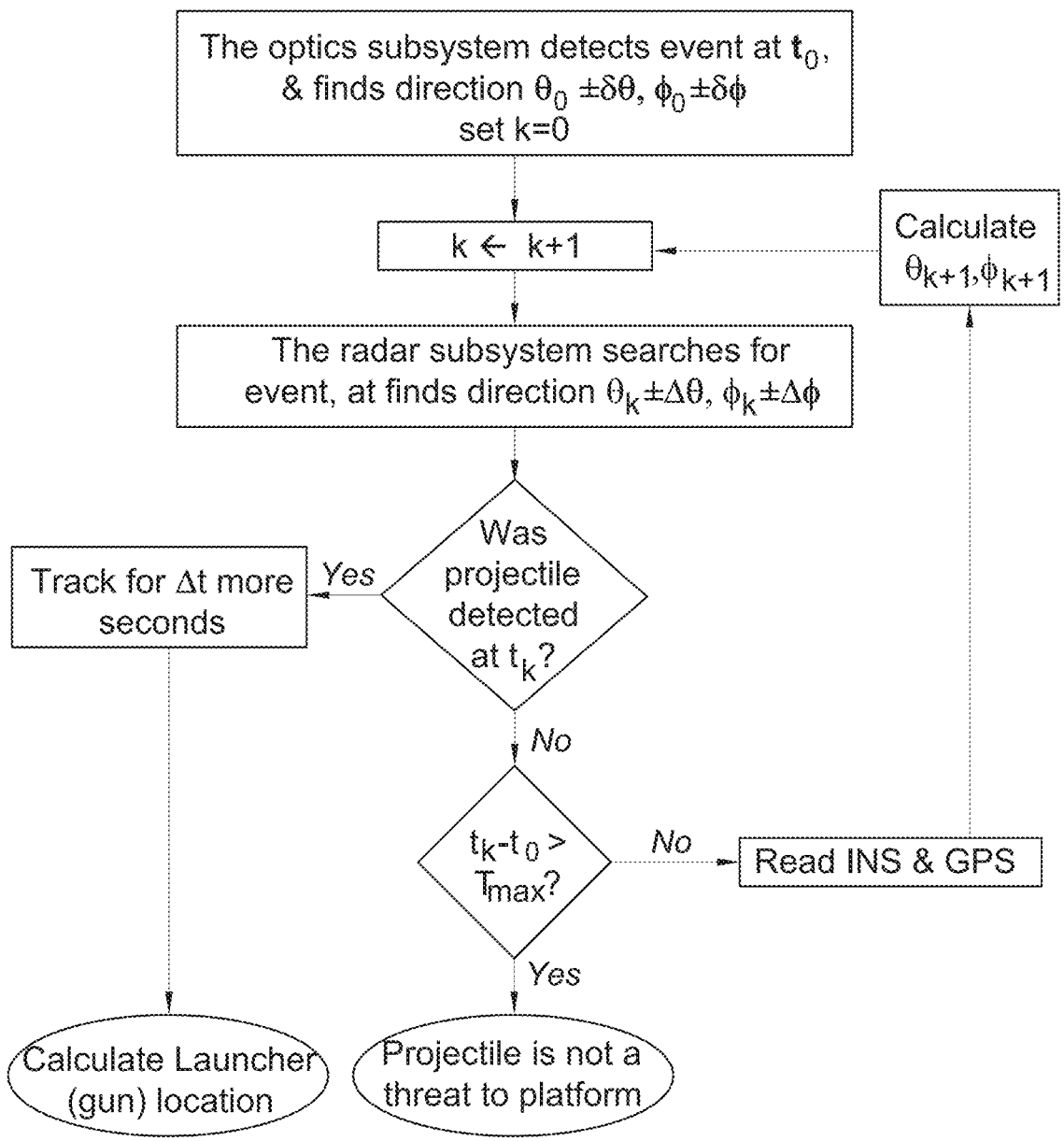
FIG. 3 is a flowchart illustration of an algorithm that can be used to control the operation of a system for estimating a source location of a projectile according to examples of the presently disclosed subject matter.

FIG. 3 is a flowchart illustration of an algorithm that can be used to control the operation of a system for estimating a source location of a projectile according to examples of the presently disclosed subject matter. The optics subsystem can detect the event and measures directions towards it, relative to the direction-reference of the optics subsystem. The radar subsystem can search for a projectile at the designated direction. If the system receives information about its own kinematic movement, it updates the search direction accordingly. If the search-time-limit is reached, and a projectile is not found within the search-direction boundaries, the system can discard the event. If a projectile is detected by the radar subsystem within the search-time limit and within the angular search boundaries, then data measured by the radar subsystem is used for calculating the projectile's origin of flight (also referred to herein as the source location). It should be noted that the entire procedure could be reversed—starting with a projectile detection by the radar subsystem, followed by a search through the optics subsystem's data memory for detected launch event at the direction of the detected projectile.

FIG. 4 is a graphical representation of the example-case projectile kinematic model (speed and range vs. time—assuming the projectile is flying directly at the system), according to examples of the presently disclosed subject matter.

Figure 5:
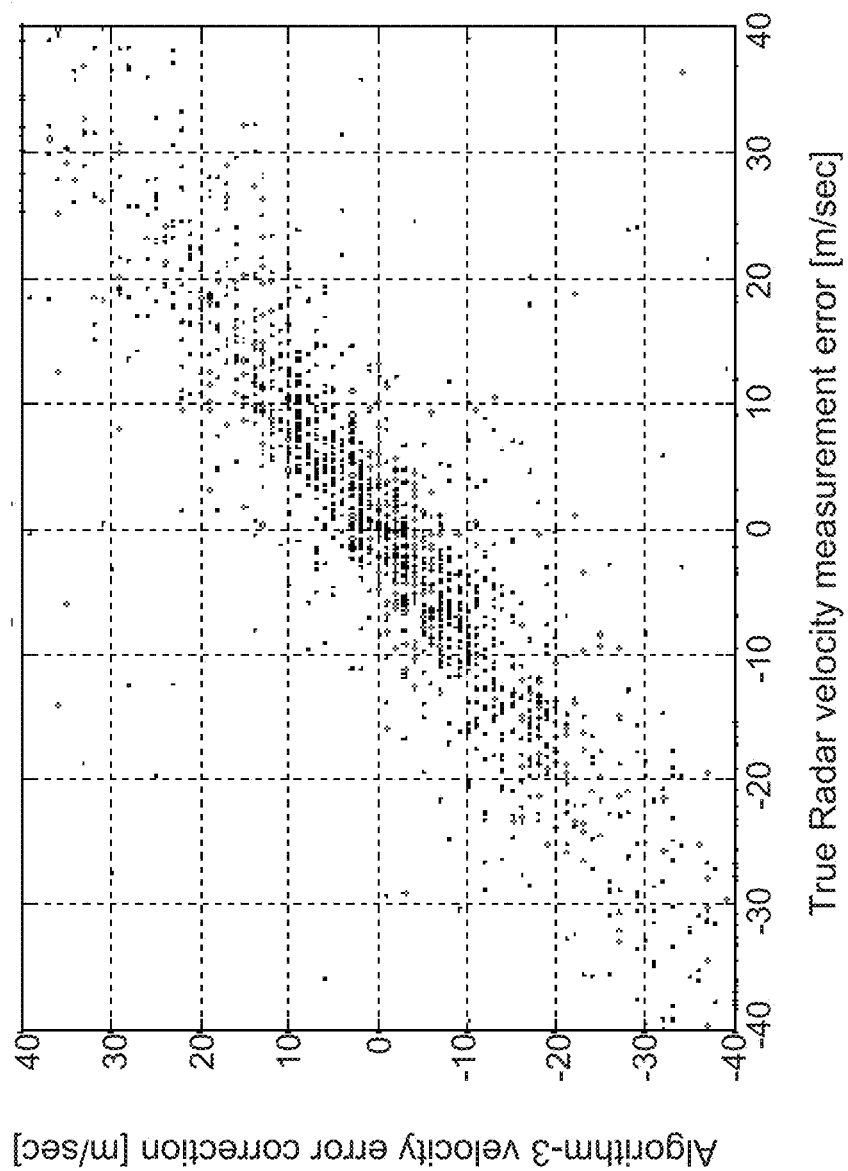
FIG. 5 is a graphical representation of the results of computation of the 3rd type algorithm, where the horizontal axis is a radar subsystem velocity measurement error and the vertical axis is a correction to that error calculated by minimizing the model fit errors as described above, for the test case scenario, according to examples of the presently disclosed subject matter.

FIG. 5 is a graphical representation of the results of computation of the 3rd type algorithm, where the horizontal axis is a radar subsystem velocity measurement error and the vertical axis is a correction to that error calculated by minimizing the model fit errors as described above, for the test case scenario, according to examples of the presently disclosed subject matter. Each point on the chart represents the result of one Monte Carlo simulation. The obvious correlation between error and correction demonstrates the success of the proposed algorithm.

Figure 6:
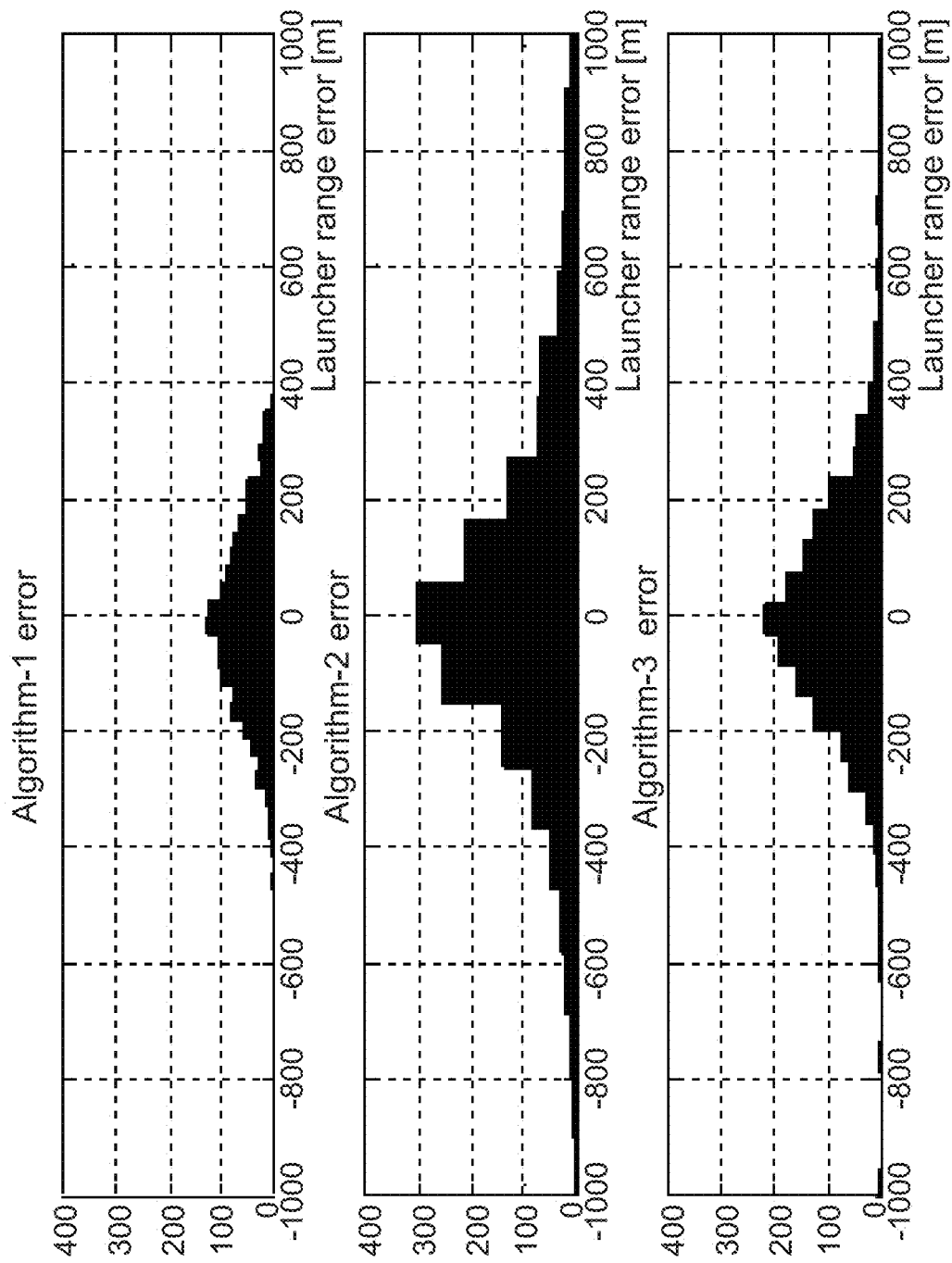
FIG. 6 is a graphical representation of the launch event range estimation error distribution, as calculated by means of a Monte-Carlo simulation of the operation of each one of the three suggested algorithms with the scenario/system parameters defined in Table-1, according to examples of the presently disclosed subject matter.

FIG. 6 is a graphical representation of the launch event range estimation error distribution, as calculated by means of a Monte-Carlo simulation of the operation of each one of the three suggested algorithms with the scenario/system parameters defined in Table-1, according to examples of the presently disclosed subject matter.

It will be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A system, comprising:
an optics subsystem;
a radar subsystem;
a Faraday cage;
a processor;
wherein the optics subsystem and the radar subsystem are substantially co-located, and
wherein the optics subsystem is installed within said Faraday cage which enables electromagnetic isolation of the optics subsystem from electromagnetic interferences (EMI) and/or radio frequency interferences (RFI) created by operation of the radar subsystem,
wherein the optics subsystem comprises a detection module adapted for acquiring at least one of (i) and (ii):

(i) a first image in a first optical spectrum band comprising potassium (K) doublet emission lines or Sodium (N) emission lines, and a second image in a second optical spectrum band different from the first optical spectrum band;

(ii) a first image in "Red-band" within MWIR spectral band, and a second image in other sub-bands of the MWIR spectral band, different from the "Red-band";

wherein the processor is configured to determine a difference between pixels of the first image and pixels of the second image, wherein the processor is configured to apply feature extraction to imaged scenery captured by the optics subsystem to identify a feature in the imaged scenery and determine a direction towards the identified feature.

2. The system of claim 1, wherein electrical leads of the optics system are located within the Faraday cage.

3. The system of claim 1, wherein the optics subsystem and the radar subsystem are co-registered.

4. The system of claim 1, wherein the optics subsystem and the radar subsystem are timely synchronized.

5. The system of claim 1, comprising a processor configured for processing measurements from the optics subsystem and the radar subsystem.

6. The system of claim 5, wherein the processor is configured to utilize measurements from the radar subsystem to process range and velocity measurements for pixels of imaged scenery captured by the optics subsystem.

7. The system of claim 5, wherein the processor is configured to take into account one or more of the following: an optical geometrical distortion of the optics subsystem, a line of sight misalignment between the radar subsystem and the optics subsystem; an optics subsystem response latency; spatial non-uniformity of the measurements; and an optical spot Centroid estimation of the optics subsystem.

8. The system of claim 1, wherein the processor is configured to perform co registration operation comprising:
obtaining, from the radar subsystem, radar measurements of radar calibration objection object positioned at a far-field range;
obtaining, from the optics subsystem, optical measurements of an optical calibration object configured to provide an optical signal at spectral band(s) detectable by the optics subsystem; and
utilizing said radar measurements and said optical measurements to determine registration between the radar subsystem and the optics subsystem.

9. The system of claim 8, wherein said radar calibration objection object is co-positioned with the optical calibration object.

10. The system of claim 8, wherein said radar calibration objection object and said optical calibration object are placed at different known locations; and
wherein the viewing direction of the radar calibration objection object from the radar subsystem, and viewing direction of the optical calibration object from the optics subsystem is used to correct direction findings of the radar subsystem and the optics subsystem, and thereby determine registration between them.

11. The system of claim 8, wherein said optical calibration object is light emitter providing modulated light; and wherein co-registration operation comprises image processing utilizing said modulation to reduce errors induced by atmospheric path turbulence and/or for optical aberrations of the optics subsystem.

12. The system of claim 11, wherein said optical calibration object generates optical signal during short periods of time.

13. A system, comprising:
an optics subsystem;
a radar subsystem;
wherein the optics subsystem comprises one or more cameras configured to acquire at least one of (i) and (ii):
(i) a first image in a first optical spectrum band comprising potassium (K) doublet emission lines or Sodium (N) emission lines, and a second image in a second optical spectrum band different from the first optical spectrum band;
(ii) a first image in "Red-band" within MWIR spectral band, and a second image in other sub-bands of the MWIR spectral band, different from the "Red-band";
a processor configured for processing measurements from the optics subsystem and the radar subsystem;
wherein the processor is configured to:
utilize measurements from the radar subsystem to process range and velocity measurements for pixels of imaged scenery captured by the optics subsystem; and
determine a difference between pixels of the first image and pixels of the second image captured by the optics subsystem,
identify one or more features in the imaged scenery based on said difference, and
determine a direction towards the one or more identified features.

14. A system, comprising:
an optics subsystem located at a first position;
a radar subsystem located at a second position substantially co-located with the first position; and
a processor configured for processing measurements from the optics subsystem and the radar subsystem;
wherein the processor is configured to perform co-registration operation between the substantially co-located optics subsystem and radar subsystem, the co-registration operation comprising:
obtaining, from the radar subsystem, radar measurements of radar calibration objection object positioned at a far-field range;
obtaining, from the optics subsystem, optical measurements of an optical calibration object configured to provide an optical signal at spectral band(s) detectable by the optics subsystem;
utilizing said radar measurements and said optical measurements to determine co-registration between a direction of the radar subsystem and a direction of the optics subsystem; and
wherein said optical calibration object is light emitter providing modulated light; and wherein said co-registration operation comprises image processing utilizing said modulation to determine position of the optical calibration object, said image processing comprising performing a difference between at least two different images of the optical calibration object acquired by the optics subsystem located at the first position, to reduce errors induced by atmospheric path turbulence and/or for optical aberrations of the optics subsystem.

* * * * *